United States Patent [19]
Nilsen

[11] Patent Number: 5,565,151
[45] Date of Patent: Oct. 15, 1996

[54] RETROREFLECTIVE PRISM STRUCTURE WITH WINDOWS FORMED THEREON

[75] Inventor: Robert B. Nilsen, Weatogue, Conn.

[73] Assignee: Reflexite Corporation, Avon, Conn.

[21] Appl. No.: 314,487

[22] Filed: Sep. 28, 1994

[51] Int. Cl.$^6$ ............................. B29D 11/00; B28B 11/18
[52] U.S. Cl. ........................ 264/1.1; 264/2.2; 264/2.5; 264/166; 264/167; 264/219; 264/284
[58] Field of Search ........................... 264/286, 1.1, 1.9, 264/2.2, 2.5, 166, 167, 219, 284, 293; 156/245, 250, 257

[56] References Cited

U.S. PATENT DOCUMENTS

| | | | |
|---|---|---|---|
| 2,380,447 | 7/1945 | Jungersen | 88/78 |
| 3,873,184 | 3/1975 | Heenan | 350/103 |
| 4,576,850 | 3/1986 | Martens | 428/156 |
| 4,588,258 | 5/1986 | Hoopman | 350/103 |
| 5,171,624 | 12/1992 | Walter | 428/156 |

FOREIGN PATENT DOCUMENTS 1476447  6/1977  United Kingdom .

OTHER PUBLICATIONS

Rityn, N. E., "Optics of Corner Cube Reflectors", *Sov. J. Opt. Tech.*, 34:198–201 (1967).
Eckhardt, H. D., "Simple Model of Corner Reflector Phenomena", *Applied Optics*, 10(7):1559–1566 (1971).

*Primary Examiner*—Donald Loney
*Attorney, Agent, or Firm*—Hamilton, Brook, Smith & Reynolds, P.C.

[57] ABSTRACT

Retroreflective prisms are formed with windows thereon by removing a portion of the prism mold on one prism pair leaving the apex of the prism intact. In this manner smaller prisms are formed adjacent larger prisms. Optionally, the optical axis of the prisms may be tilted with respect to one another, preferably in a negative direction. The smaller prisms with windows provide increased brightness and optimize the retroreflection light.

11 Claims, 14 Drawing Sheets

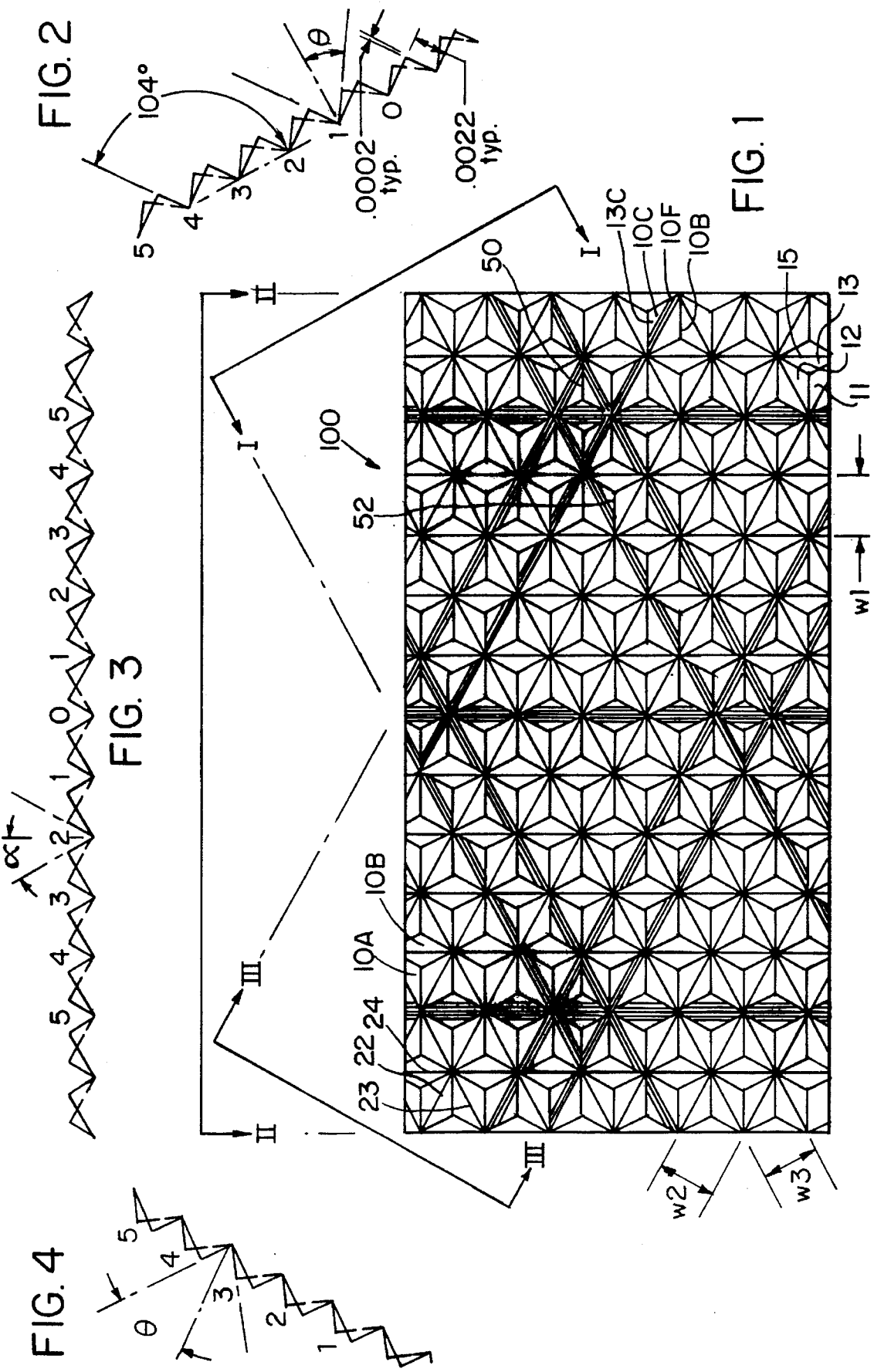

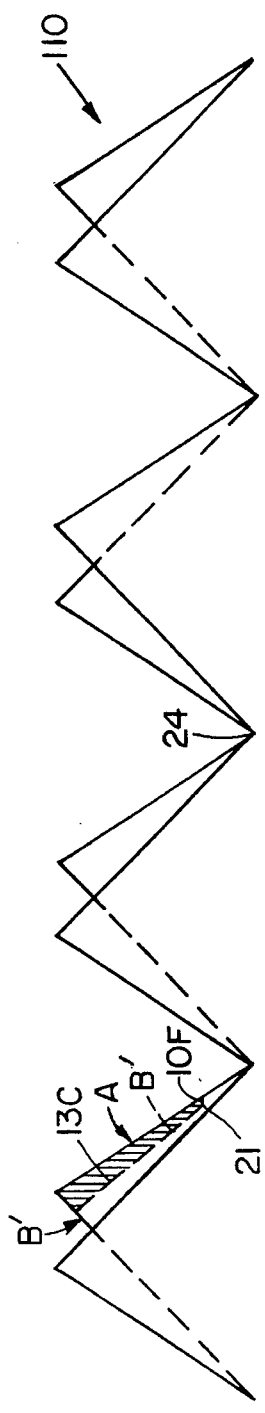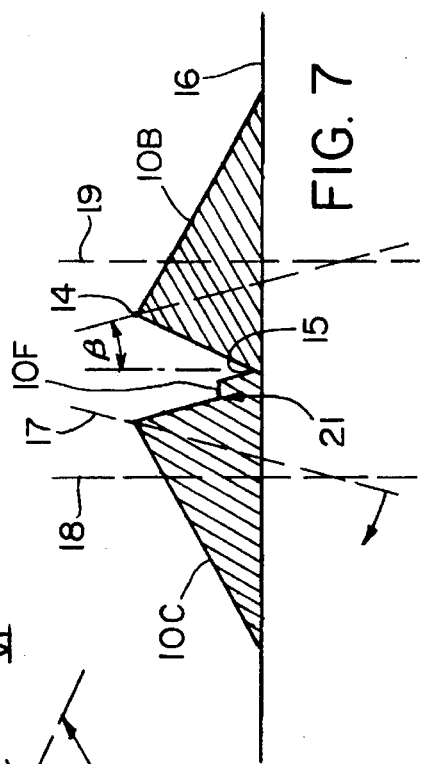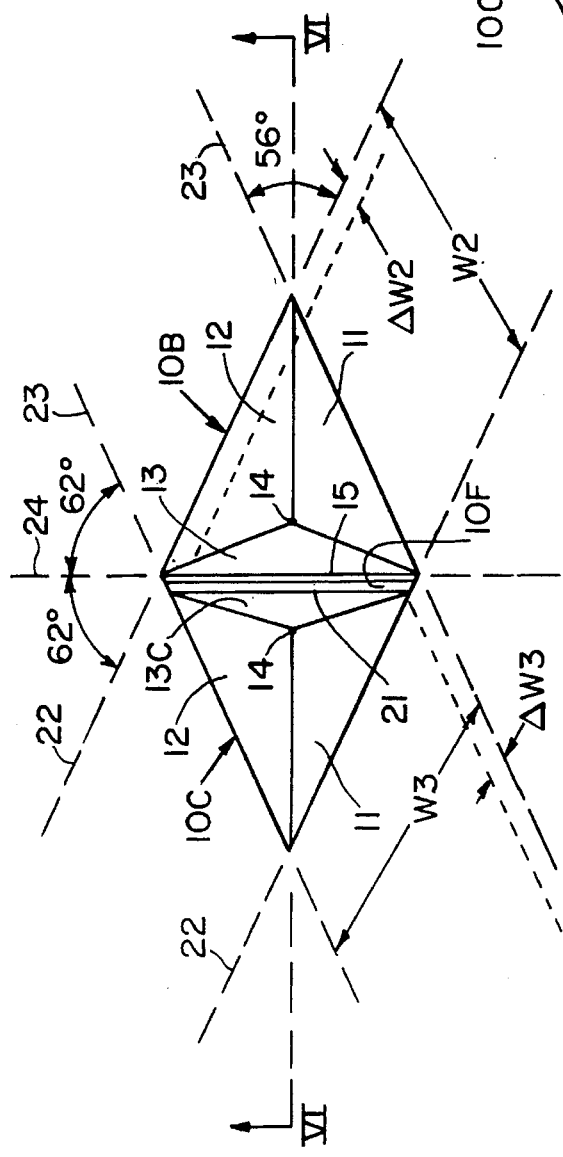

RETROREFLECTIVE PRISM STRUCTURE WITH WINDOWS FORMED THEREON

RELATED APPLICATION

This application is related to U.S. Ser. No. 08/314,462 (Attorney Docket No. RFX-281), filed of even data herewith and incorporated herein in its entirety by reference.

BACKGROUND OF THE INVENTION

Retroreflective structures of the type utilized herein are described in detail in the Jungersen U.S. Pat. No. 2,380,447, issued Jul. 31, 1945, the Hoopman U.S. Pat. No. 4,588,258, issued May 13, 1986 and the Stamm U.S. Pat. No. 3,712,706, issued Jan. 23, 1973 (each of which is incorporated herein in its entirety by reference.) In particular FIG. 15 of the Jungersen patent illustrates in plan view a sheet of reflective prisms which reflect light at an angle other than perpendicular to the reflector. The Hoopman patent discloses cube-corner retroreflective articles in which the optical axis of the elements in an array of prism element pairs are tilted toward one edge of the elements, when considered from the front surface of the article on which light to be retroreflected images. This tilt direction is herein defined as "positive" type tilt; as contrasted to the tilt direction shown in FIG. 15 of the Jungersen patent in which the optical axis of prism pairs tilts away from the common edge.

Walter, U.S. Pat. No. 5,171,624 discloses microprism reflective sheeting in which prism pairs are tilted with respect to one another at an angle of 3°–10°, a prism size of 0.006–0.025 (space between apices) and wherein at least one prism side surface is arcuate.

Benson U.S. Pat. No. 5,122,902 discloses retroreflective cube-corner elements with separation surfaces between elements and truncated cube-corner elements.

SUMMARY OF THE INVENTION

Contrary to the foregoing teachings in the prior art, cube corner retroreflective articles having wide observation angle performance, uniform orientation angle performance and wide angularity in multiple viewing planes, superior whiteness properties and truer color are provided by an array of retroreflective prism elements wherein pairs of such elements are tilted in a negative direction with respect to one another and wherein windows are formed in one of the prisms of some of the prism pairs adjacent the intersection between prism pairs. The prism elements are corner cubes formed of three lateral mutually perpendicular planar faces defined at their bases by linear edges which do not necessarily lie in a common plane.

The windows are formed by casting the elements on a mold in which a section of the prism element mold is removed.

Removing a section of one of the prism mold elements creates a smaller prism element which produces increased observation angle performance. Good observation angle performance is especially important for retroreflecting objects viewed by trucks or airplanes where the source of light is spaced a further distance from the driver than an automobile. Such improved performance is also important for automobile drivers when the driver is very close to the retroreflecting object.

BRIEF DESCRIPTION OF THE DRAWINGS

FIG. 1 is a plan view of a portion of the retroreflective sheeting of the invention.

FIG. 2 is a side-view of a portion of the top surface of the sheeting of FIG. 1 taken along lines I—I.

FIG. 3 is a side-view of a portion of the top surface of the sheeting of FIG. 1 taken along lines II—II.

FIG. 4 is a side-view of a portion of the top surface of the sheeting of FIG. 1 taken along lines III—III.

FIG. 5 is an enlarged side view of a master mold for an array of prisms illustrating how the small prisms 10C and faces 10F of FIG. 1 are formed.

FIG. 6 is an enlarged plan view of a single pair 10C/10B of prism elements of the invention.

FIG. 7 is a side-view of the prism elements of FIG. 6 taken along lines VI—VI.

DETAILED DESCRIPTION OF THE INVENTION

Figure 8:
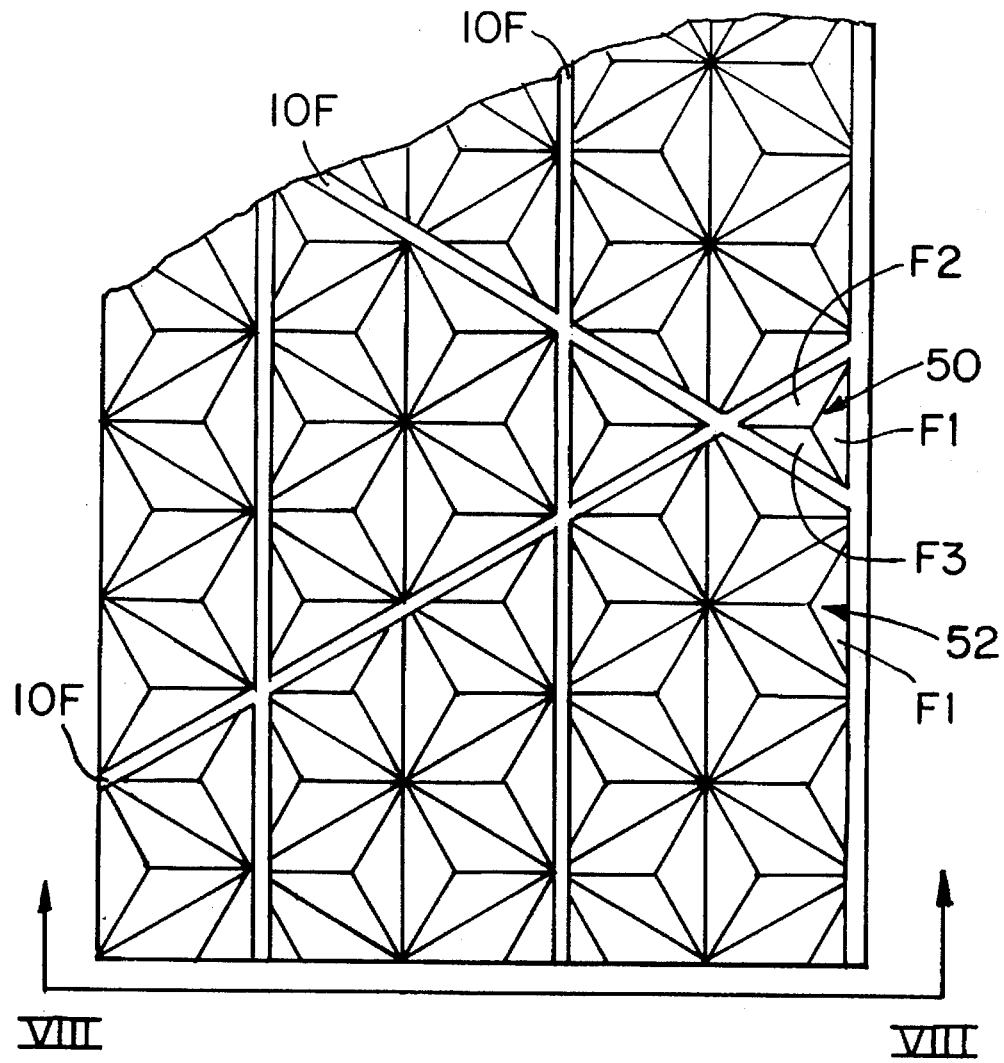
FIG. 8 is a plan view of an alternate embodiment.

Referring now to FIGS. 1–7, an ultra thin flexible sheeting 100 of the invention is shown. The term "sheeting" as used herein refers to relatively thin sheet-like structures as well as thicker members, laminates and the like, which have a substantially planar front face upon which light rays impinge and which have a body portion which is essentially transparent to the light rays. The article 100 is generally comprised of a dense array of micro sized cube corner elements 10 arranged in pairs 10A, 10B as described in co-pending U.S. patent application Ser. No. 08/314,462 filed concurrently herewith (Attorney Docket No. RFX-281). The optical axes 17 (the trisector of a internal angle defined by the prism faces 11, 12, 13) of the elements are tilted away from one another (negative tilt). The angle of tilt β (FIG. 7) is preferably more than 1.0 degree and less than about 7.0 degrees with respect to a perpendicular 19 extending from the near common plane 16 in which the base edges of the cube corner approximate. Preferably the cube corner base width W1, W2, or W3 of the base is formed on a common plane in which the base edges of the cube corner faces 11, 12 & 13 lie, and the width or size dimension is greater than 0.0005 inches and preferably less than 0.006 inches but may extend beyond 0.006 inches to about 0.025. Optimally W1-W3 are about 0.004 inches.

The materials used to manufacture flexible articles 100 have indices of refraction which are preferably from 1.4 to 1.7. The thickness of the cube corner prism material is preferably a minimum of 0.0002 inches thick and a maximum of 0.004 inches thick. The total thickness of the articles is determined by the protective and bonding layers (shown in the referenced co-pending application) used to manufacture the finished article. The groove angles θ and α (FIGS. 2, 3 and 4) are preferably about 64.5° and 73.4° respectively.

So far the description of article 100 is substantially as described in the referenced co-pending application. The point of departure is shown in FIGS. 1 and 6 where it may be seen that certain of the prisms 10C in a pair have at least one face 13C which is foreshortened with respect to an opposing face 13 of a prism pair. This is accomplished, as shown in the side view (FIG. 5) of a mold 110 used to make the sheeting 100 of FIG. 1.

The mold structure 110 is created by first ruling or flycutting a master from suitable material, such as, brass or copper, in three directions spaced about 56° and 62°) from one another (with the above-referenced groove angles to achieve a 3° tilt) to form three sets of grooves 22,23, 24 as shown in the partial view of FIG. 5. Then, in a secondary ruling or flycutting operation a section A of every prism in a groove is removed along line B'—B' down to line 21 without changing the corner cubes on either side of the corner cube which is cut.

The area removed in the second pass creates a flat area 10F (See FIG. 6) and a smaller corner cube retroreflector 10C when the sheeting 100 is molded. Note that the cut that produces face 13C forms a corner cube structure 10C which has two faces (11 and 12) which are larger than face 13C. The corner cube structure 10C created with modified face 13C has an effective aperture that is slightly skewed because the line widths $W_3$ and $W_2$ are smaller by $\Delta W3$ and $\Delta W2$ than the original width of the prisms corner cubes, made in the first pass.

Also note that the window 10F which is created is not located in the base plane 16 of the corner cube 10C (See FIG. 7). That is, it is not bounded by the base edges of the lateral faces of the corner cube elements.

Also note that the flat area of face 10F is formed in a way which does not change the corner cube elements immediately adjacent. Corner cube 10B is left undisturbed by the process of forming area face 10F.

Figure 9:
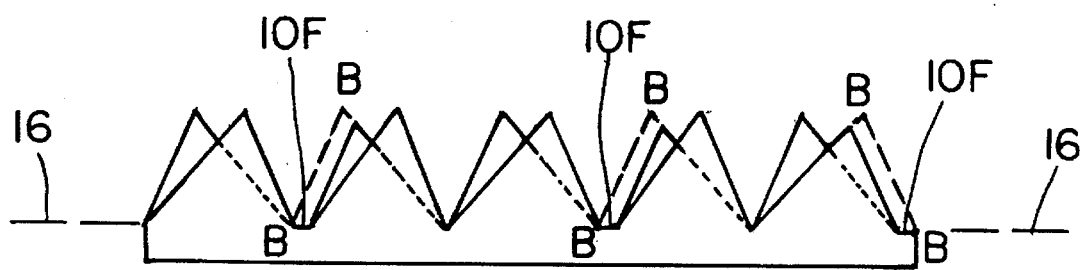
FIG. 9 is a side view of FIG. 8 taken along lines VIII—VIII.

Another example of removing the area on one face of a row of prisms is shown in the plan view of FIG. 8 and side view of FIG. 9.

In this example, the windows 10F are formed in the base plane 16 and the corner cubes formed have one face F1 or three faces F1–F3 modified by the second cutting pass.

Corner cube 50 has all faces modified creating a smaller corner cube.

Corner cube 52 has only one face modified creating a corner cube which has a skewed effective aperture.

Figure 10:
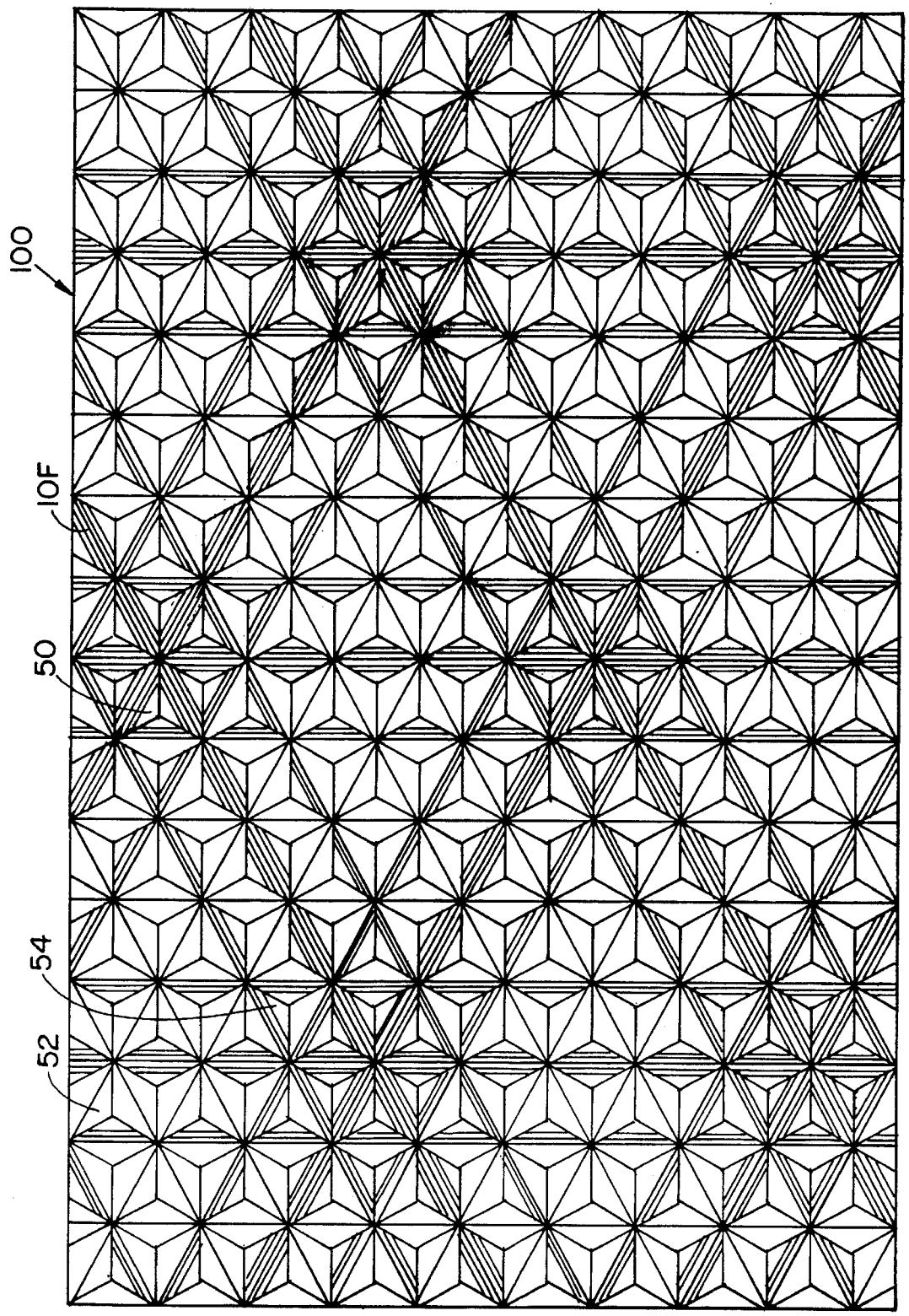
FIG. 10 is a plan view of a further embodiment of the sheeting of the invention.

The second pass ruling or flycutting shown by dotted line B'—B' in FIG. 5 and B—B in FIG. 9 can be implemented or configured in many ways. Some examples are shown in FIGS. 1 and 10. The grooves which are modified determine the number of new full smaller corner cubes 50 created; the number of corner cubes with one face modified 52; with two faces modified 54; all faces modified 50 and the direction of the corner cubes face. In the example of FIG. 10:

| | |
|---|---|
| 8 out of 70 corner cubes are untouched | 11.4% |
| 40 out of 70 corner cubes, one face is changed | 57.1% |
| 10 out of 70 corner cubes, two faces are changed | 14.3% |
| 12 out of 70 corner cubes, three faces are changed | 17.2% |
| | 100% |

Depending on the spacing between the grooves that are modified, the retroreflecting area can be made to have any number of windows as desired and therefore can be adjusted to provide the desired back lighting (as described below). The area of the corner cubes that is removed in the second pass, as well as the size of the corner cubes created in the first pass, can be defined to optimize window size and the retroreflected light distribution produced by the different size corner cubes which are formed. The windows 10F also have the effect of allowing adjustment of the "cap Y" or whiteness values of non-metallized and metallized retroreflections.

The microprism sheeting 100 is conveniently formed by casting prisms upon a film surface functioning as the body, or by embossing a preformed sheeting, or by casting both body and prisms concurrently. Generally, the resins employed for such cast microprism sheeting are cross-linkable thermoplastic formulations, and desirably these resins provide flexibility, light stability, and good weathering characteristics. In some instances, the front face of the retroreflective sheeting may be provided with a protective coating such as by application of a lacquer or other coating material. Other suitable resins for the retroreflective sheeting include vinyl chloride polymers, polyesters, polycarbonates, methyl methacrylate polymers, polyurethanes and acrylated urethanes.

To protect a relatively thin body member during processing, a relatively thick carrier may be temporarily bonded thereto, and it will generally have a thickness of 0.001–0.004 inch. The adhesive used to effect the temporary bonding therebetween and which preferentially adheres to the carrier is conveniently a silicone adhesive applied to a thickness of about 0.00025–0.0005 inch. When ultraviolet curing of the resin in the prisms is employed, the adhesive must be transparent to the light rays. Although various resins may be employed for such a carrier, polyesters, and particularly polyethylene terephthalate, are desirably employed because of their toughness and relative resistance to processing conditions. As with the adhesive, the carrier should be transparent to the ultraviolet radiation used to effect curing. Moreover, the surface of the carrier may be treated to enhance the preferential adhesion of the adhesive to the surface of the carrier.

A particularly advantageous method for making such cast retroreflective sheeting is described and claimed in Rowland U.S. Pat. No. 3,689,346 granted Sep. 5, 1972 in which the cube corner formations are cast in a cooperatively configured mold providing microprism recesses and are bonded to sheeting which is applied thereover to provide a composite structure in which the cube corner formations project from the one surface of the sheeting.

Another method for fabricating such microprism sheeting is described in Rowland U.S. Pat. No. 4,244,683 granted Jan. 13, 1981 in which the cube corner formations are produced by embossing a length of sheeting in suitable embossing apparatus with molds having precisely formed microprism cavities and in a manner which effectively avoids entrapment of air.

The latter method has been used for forming sheeting of acrylic and polycarbonate resins which the former method has proven highly advantageous for forming retroreflective sheeting from polyvinyl chloride resins and, more recently, polyester body members with prisms of various resin formulations including acrylated epoxy oligomers.

It is customary to provide a backing sheet behind the microprisms so as to protect them and to provide a smooth surface for application of the structure to support surfaces. To effect lamination of such a backing sheet to the retroreflective sheeting, adhesives and ultrasonic welding have generally been employed.

As previously described, the reflective interface for the prisms may be provided by a reflective coating or by an air interface. In the preferred embodiment of the present invention, a reflective coating is provided upon the surfaces of at least some of the microprisms, and such reflective coatings have most commonly been vacuum metallized aluminum or other specular metal deposits, although metallic lacquers and other specular coating materials have also been used.

A colored coating material may be provided over some of the prisms to provide a daytime coloration. Such a material may be a colored lacquer applied to the surface of the sheeting, a colored adhesive, or any other colored deposit which will coat the prism surfaces. Conveniently, a colored adhesive is employed since this will enable bonding of the backing material thereto.

A retroreflective material utilizing some prisms which have reflective air interfaces and others which utilize a reflective coating offers some advantages and is described in detail in Martin U.S. Pat. No. 4,801,193 granted Jan. 31, 1989. If so desired, retroreflective sheeting may be produced by applying the backing material to a partially metallized materials so as to maintain the air interface in the uncoated areas.

To produce a sheeting which exhibits a daytime coloration, a colored coating may be applied over the entire area of a partially metallized surface so that it directly coats the unmetallized prisms. Thereafter, the backing material is applied. In an alternate colored embodiment using an air interface for retroreflection, a colored adhesive is applied in a pattern to the prism surface and to a depth greater than the height of the prisms. When the backing element is laminated thereto, it is spaced from the prisms by the adhesive and this provides an air interface about the uncoated prisms.

The backing material may be any suitable material. For flexibility, it is a woven or laid fabric, or a flexible, durable polymeric material. Suitable resins include polyethylene, polypropylene, polyurethanes, acrylated polyurethanes and ethylene/vinyl acetate copolymers. Polyester and urethane fabrics may be employed as well as those of natural fibers such as cotton. Flame retardants may be incorporated in the adhesives as well as in the fabric or resin backing to impart flame retardance to the retroreflective material.

Although other metals may be used to provide a specular metal deposit including silver, rhodium, copper, tin, zinc, and palladium, the preferred and most economical processes utilize aluminum vacuum deposition. Other deposition techniques include electroless plating, electroplating, ion deposition and sputter coating.

The step of adhering the backing to the retroreflective sheeting may simply involve passing the adhesively coated retroreflective sheeting through the nip of a pair of rolls together with the backing material to apply the necessary pressure to effect adhesion. If a heat activatable adhesive is employed, the retroreflective sheeting may be subjected to preheating prior to passage through the rolls, or the rolls may be heated to achieve the necessary activation. However, it is also practicable to employ ultrasonic welding and other techniques to bond the backing material to the retroreflective sheeting by the material of the backing material itself when it is thermoplastic.

To provide a coloration to the retroreflective light at night, a dye may be incorporated in the resin used to form the body member, and even the prisms. As an alternative to a dye and as an effective necessity in some resin systems, the colorations may be provided as a finely divided pigment which is well dispersed; however, some loss in retroreflectivity will occur as the result of refraction by pigment particles which are directly in the path of light rays.

EXPERIMENTAL DATA

Note: the following terms have the following meaning:

entrance angle, this angle denotes the inclination of the object.

observation angle, angle between the illumination axis and the observation axis.

orientation angle, angle indicating orientation after rotation about the retroreflector axis.

Figure 11A:
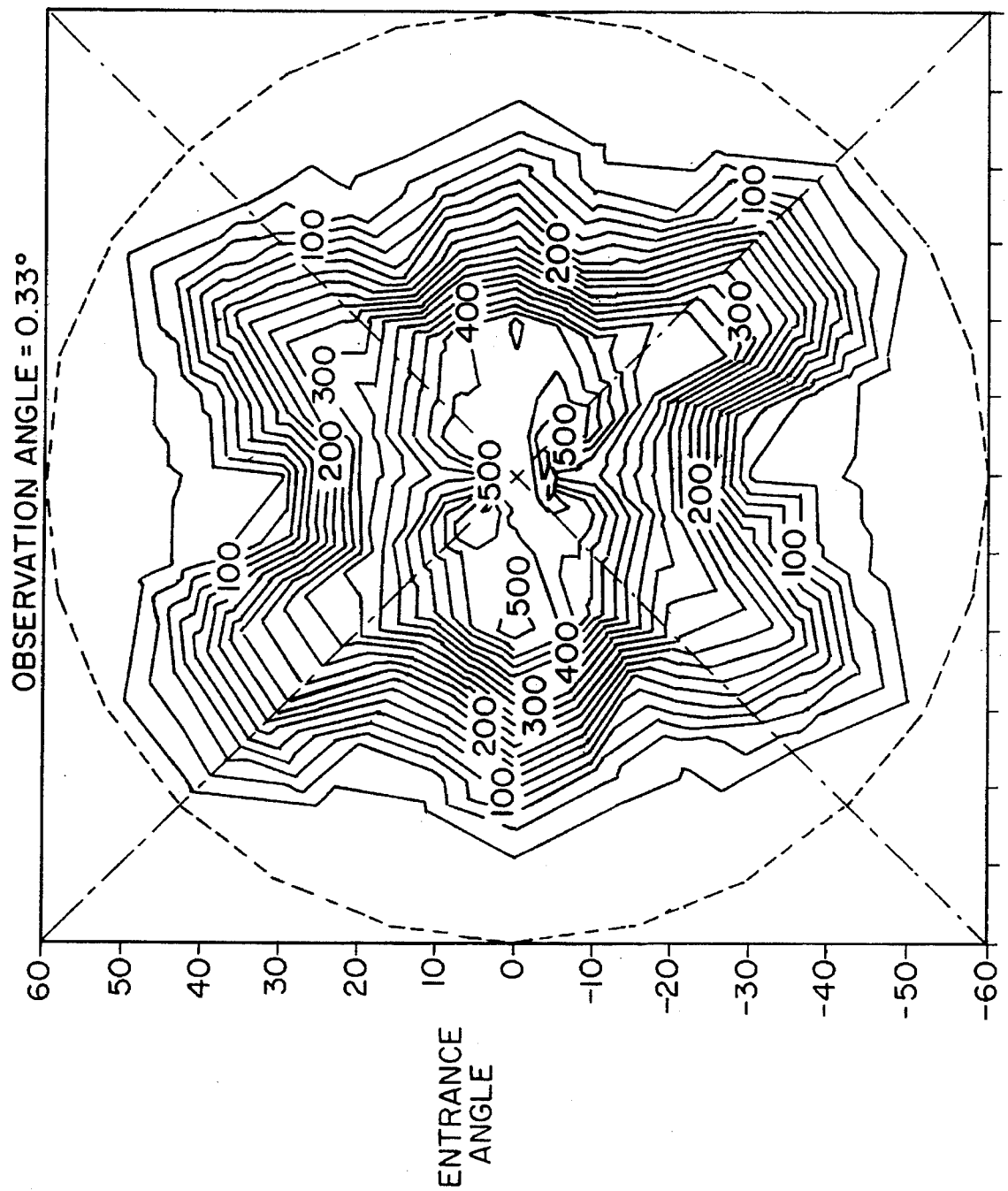
FIG. 11A is a plot of the intensity of light reflected from 0.0055 inch prism size, 3° negative tilt prism, with air backed reflector sheeting formed with no windows taken at an observation angle of 0.33°.
Figure 11B:
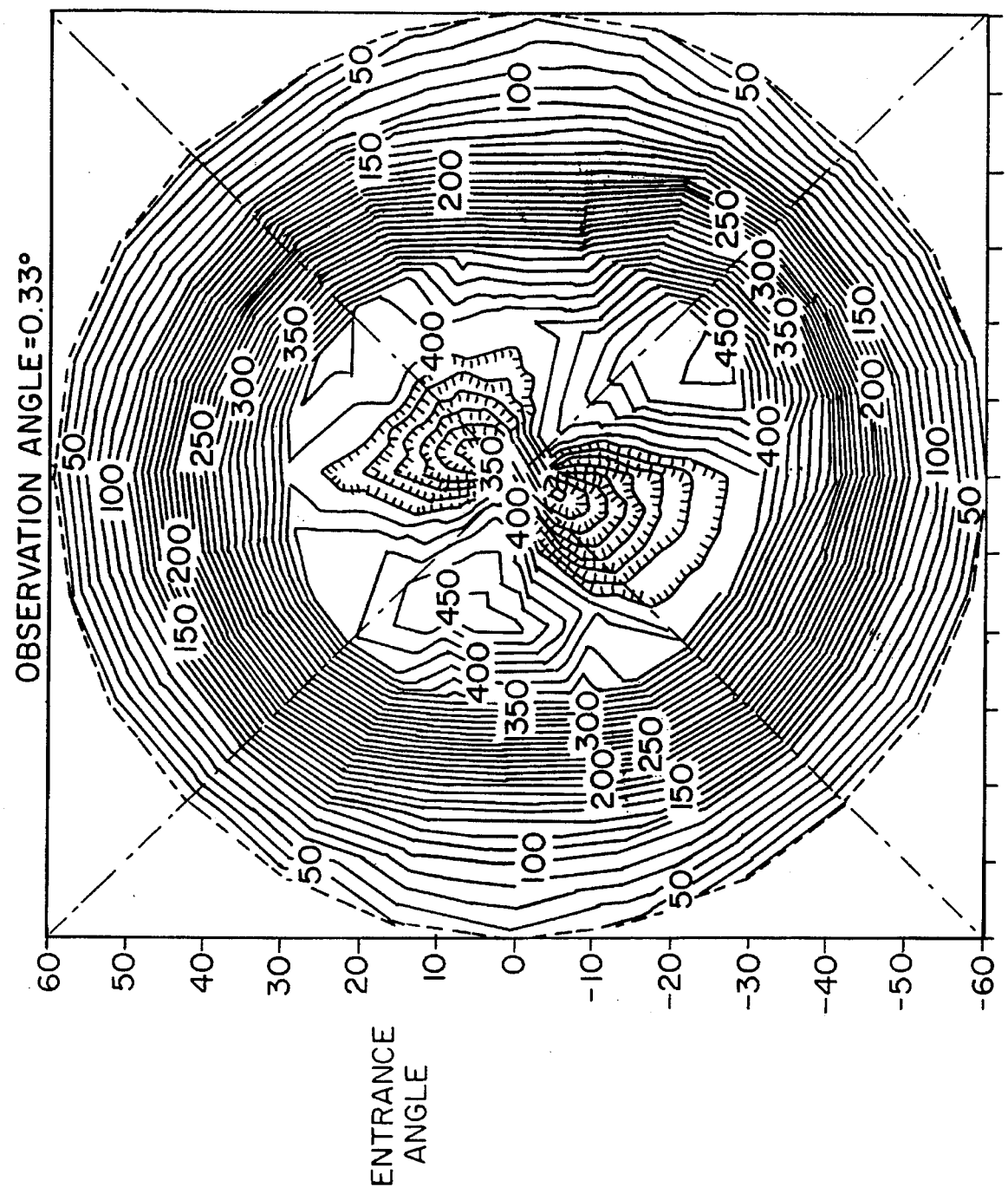
FIG. 11b is a plot as in FIG. 11A taken at the same observation angle with metallized sheeting.
Figure 11C:
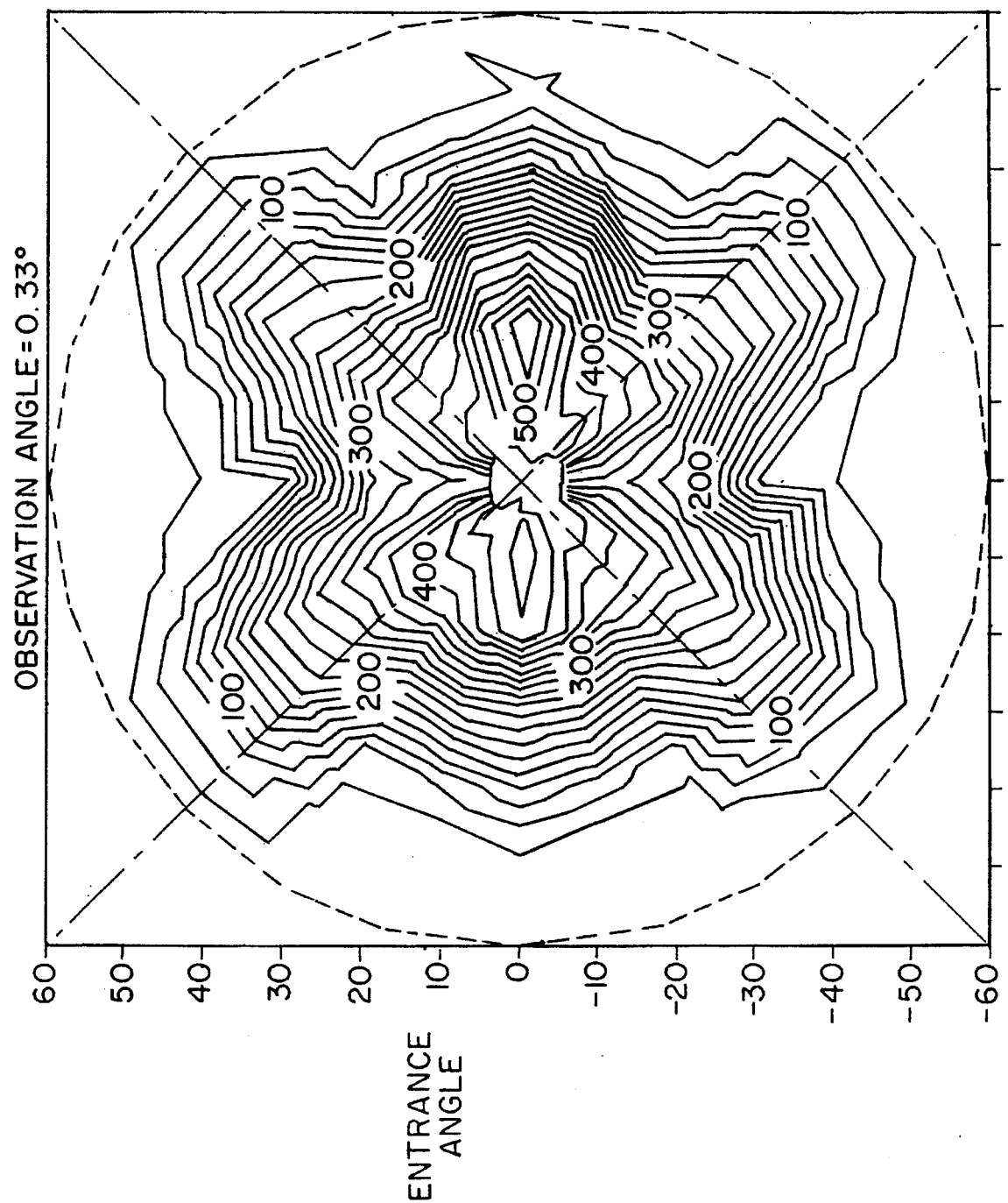
FIG. 11C is a plot as in FIG. 11A with the addition of windows in accordance with the present invention.
Figure 11D:
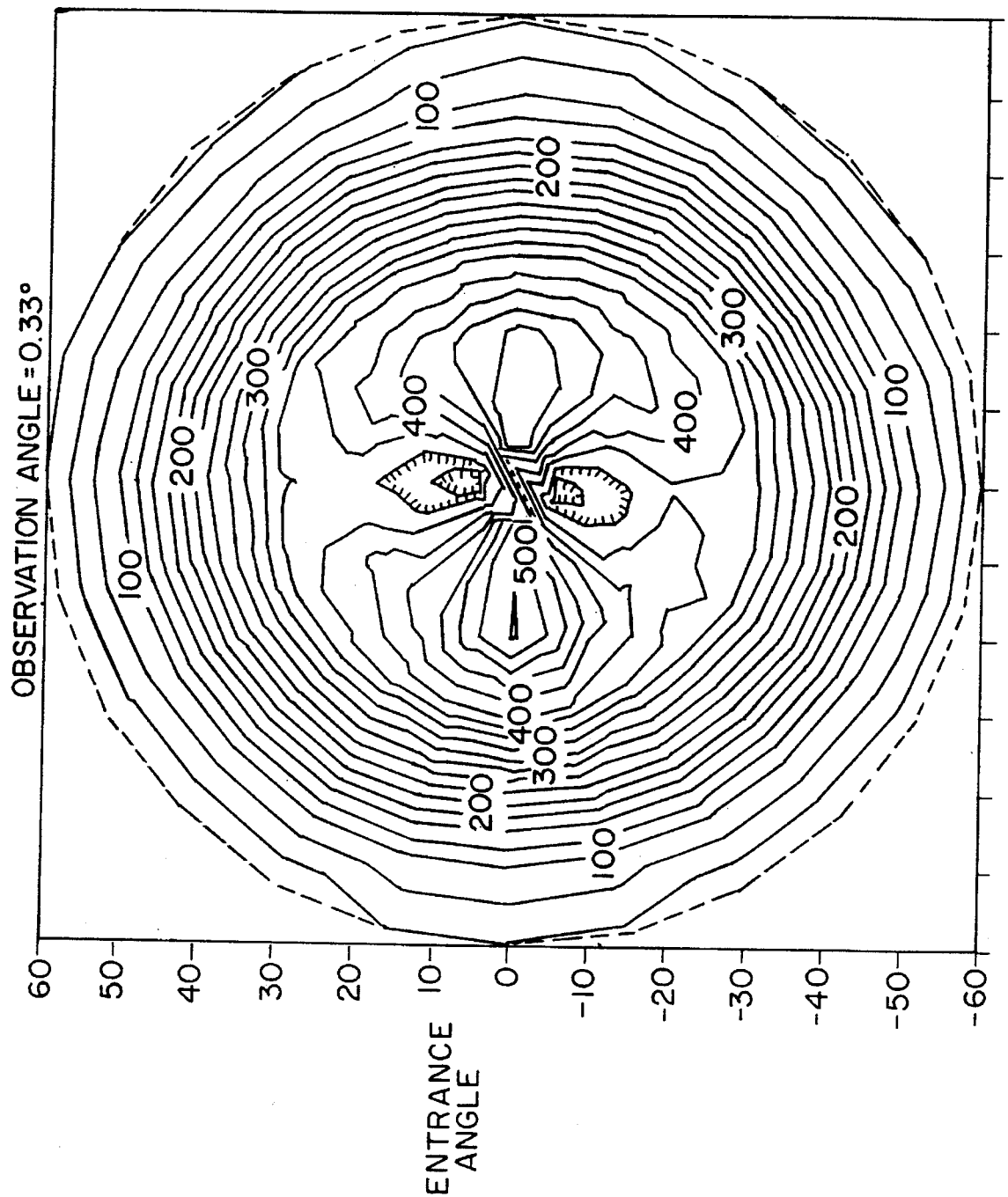
FIG. 11D is a plot as in FIG. 11B with the addition of windows in accordance with the embodiment depicted in FIG. 14 of the present invention.
Figure 12A:
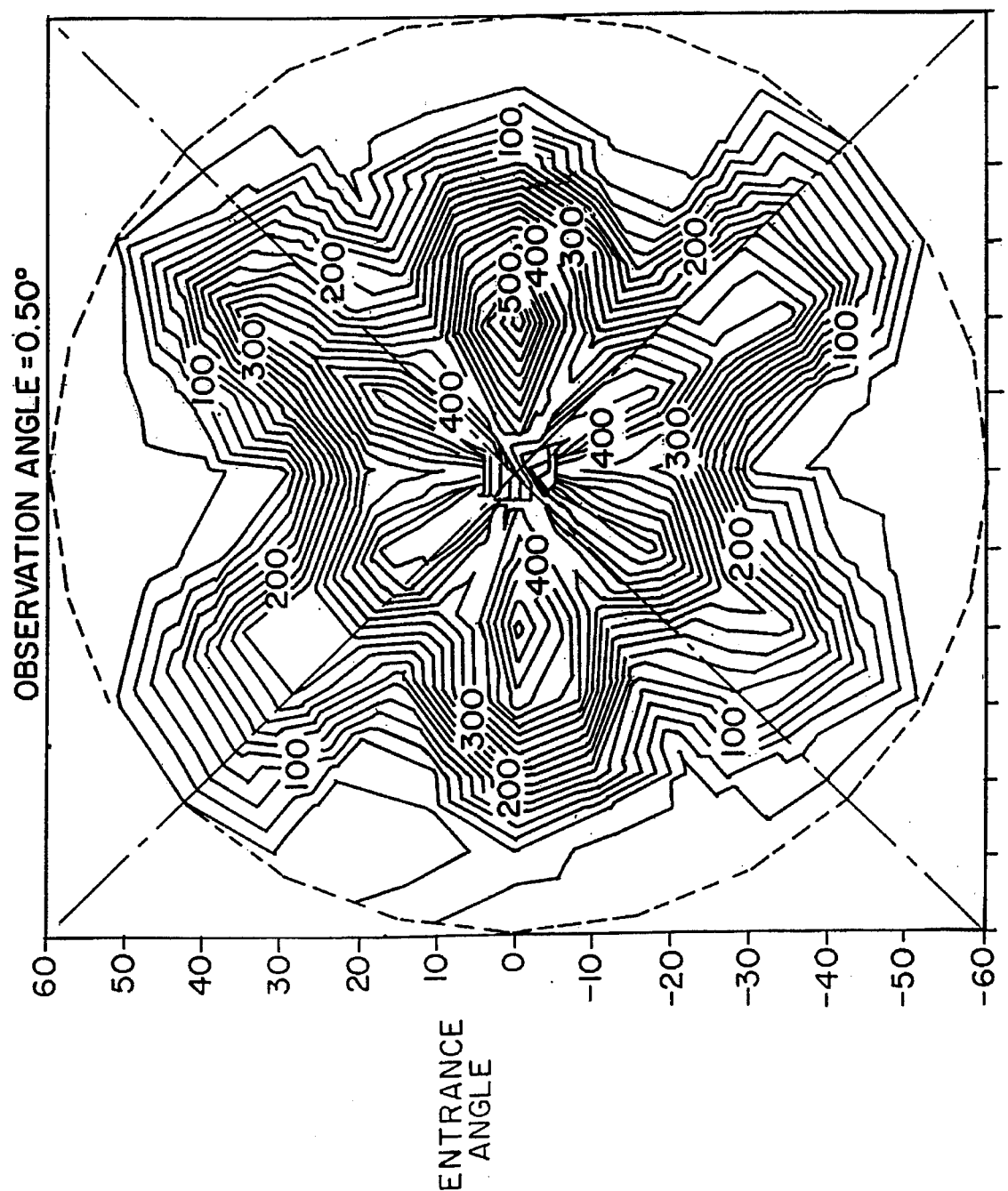
FIG. 12A is a plot as in FIG. 11A for relatively smaller 0.004 inch size prisms with 3° negative tilt and no windows at 0.50° observation angle.
Figure 12B:
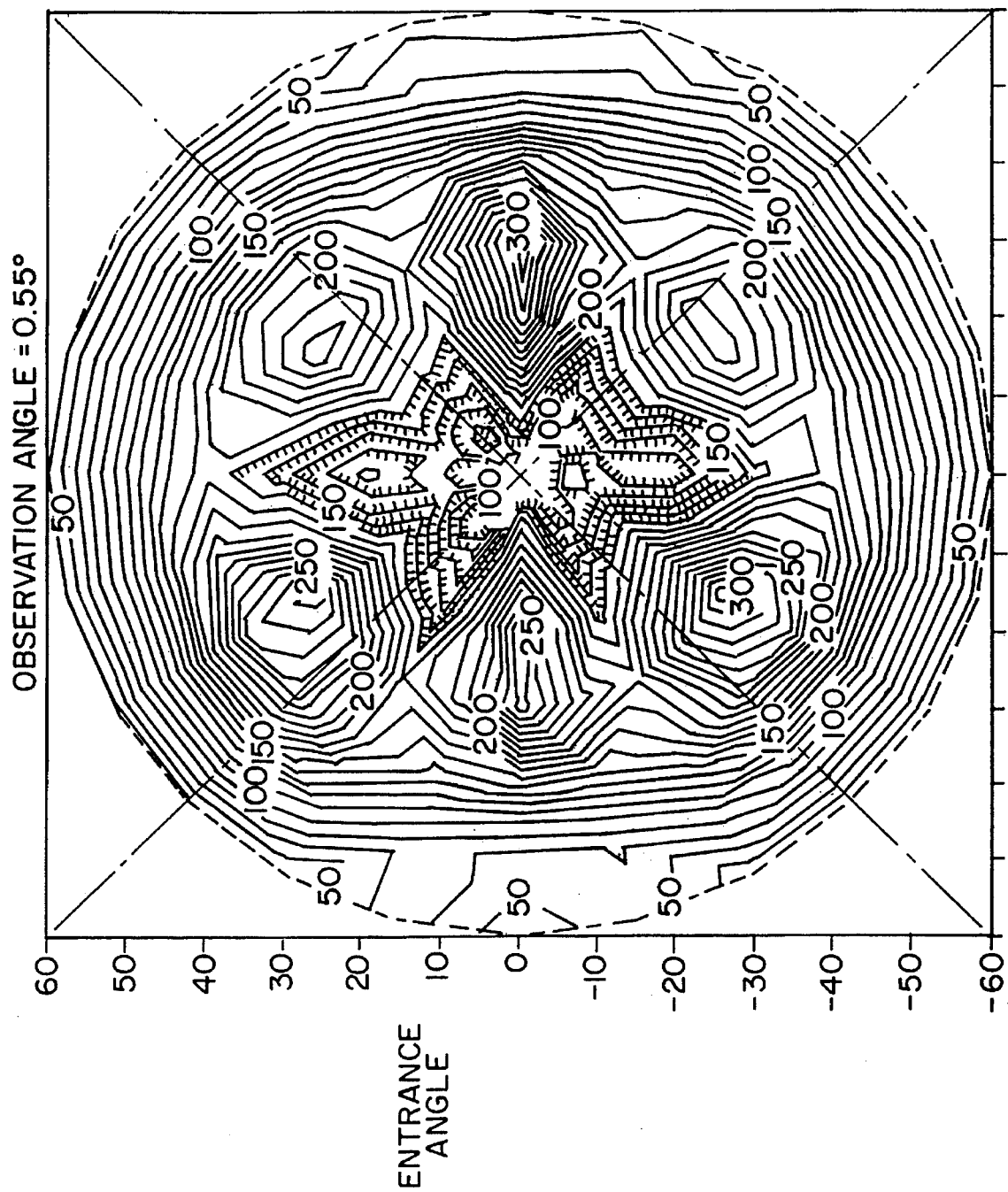
FIG. 12B is a plot as in FIG. 12A at the same observation angle with metallization.
Figure 12C:
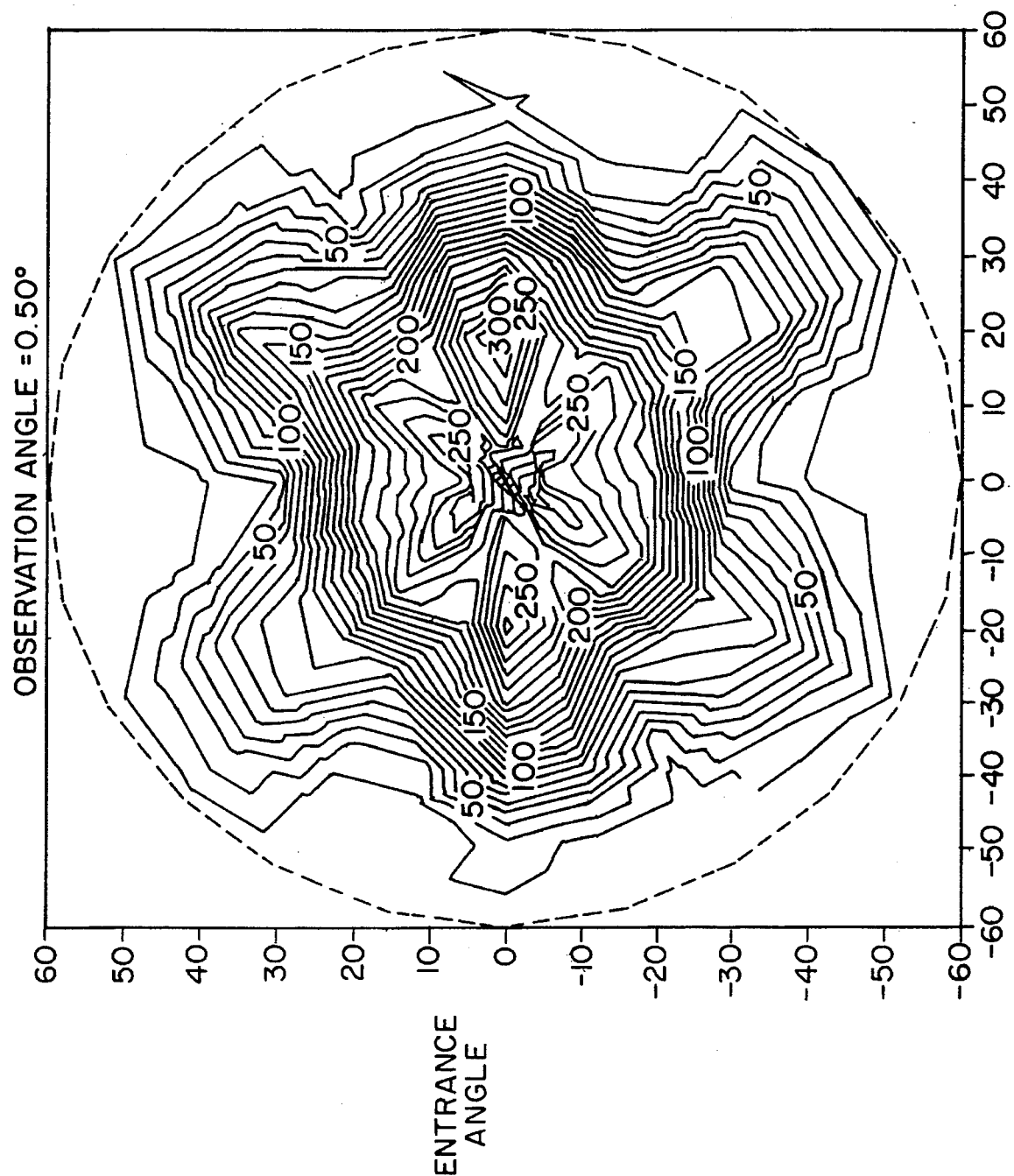
FIG. 12C is a plot as in FIG. 12A with windows.
Figure 12D:
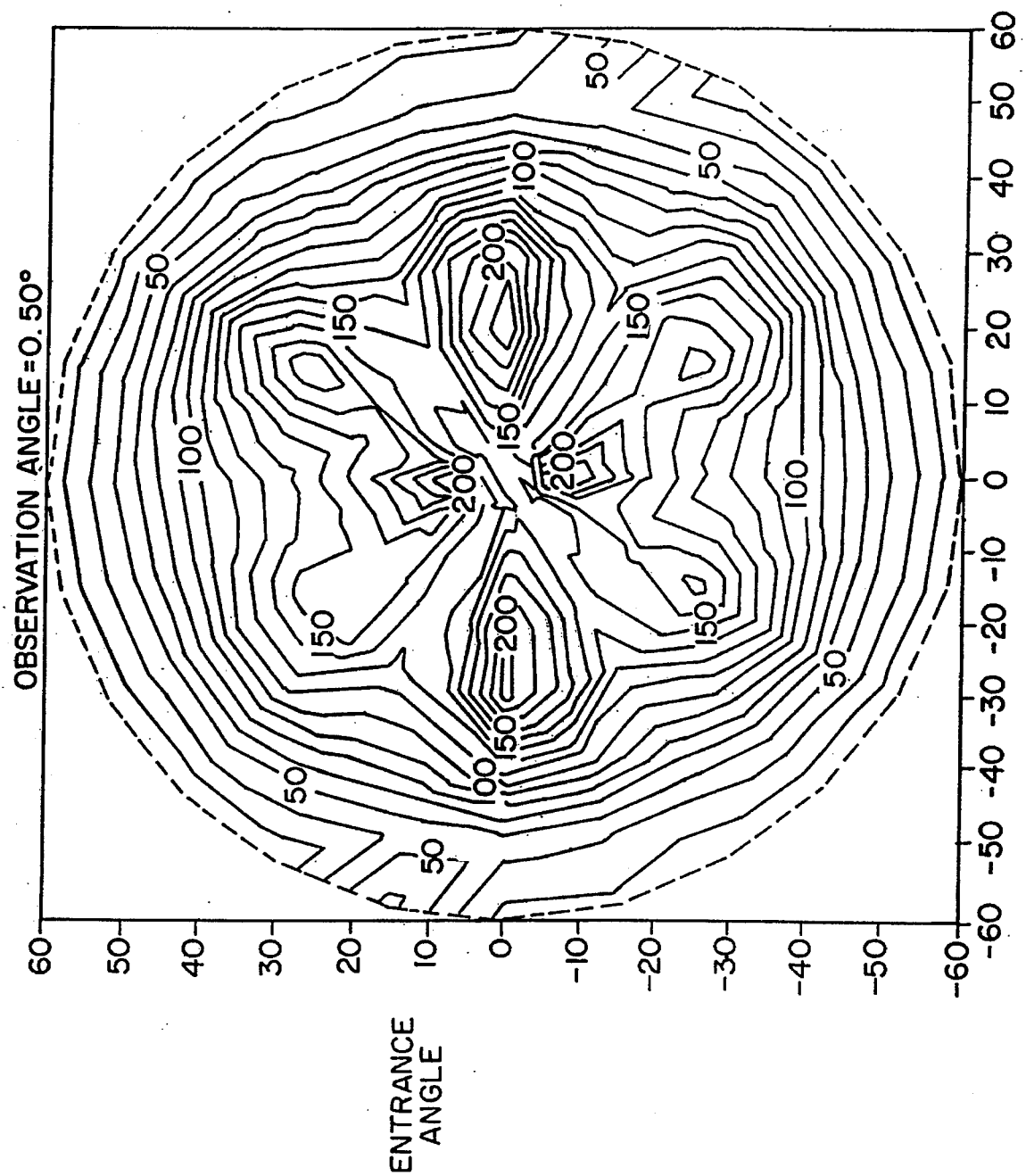
FIG. 12D is a plot as in FIG. 12B with windows and metallization in accordance with the prism embodiment of FIG. 16.
Figure 13:
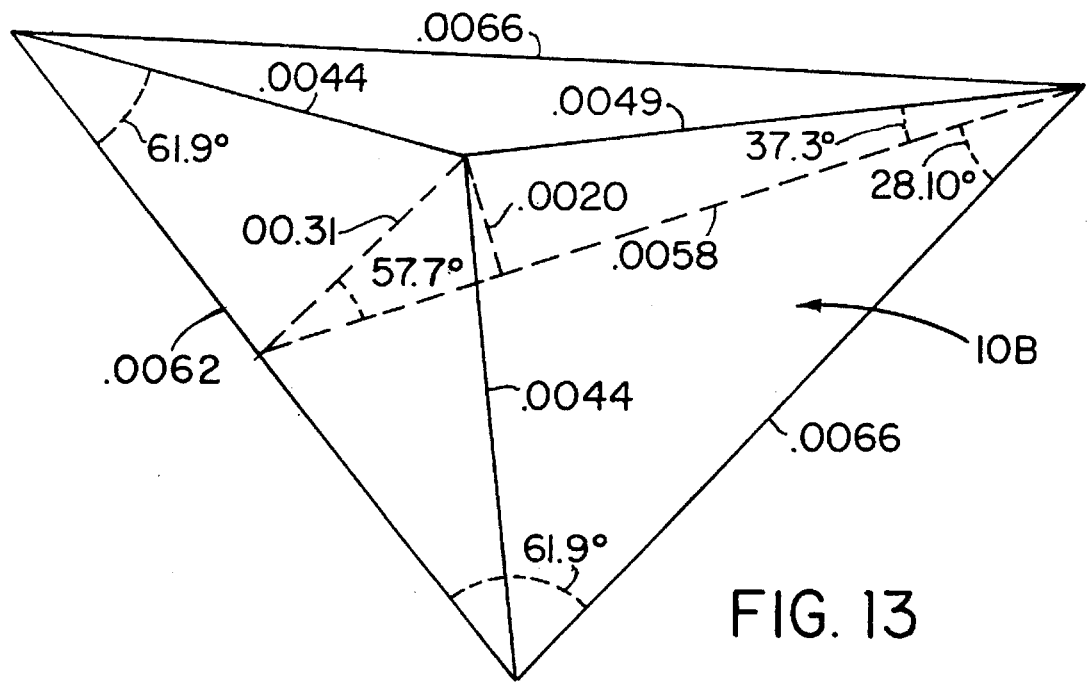
FIG. 13 is a dimensional perspective view of a prism 10B formed in accordance with the invention.
Figure 14:
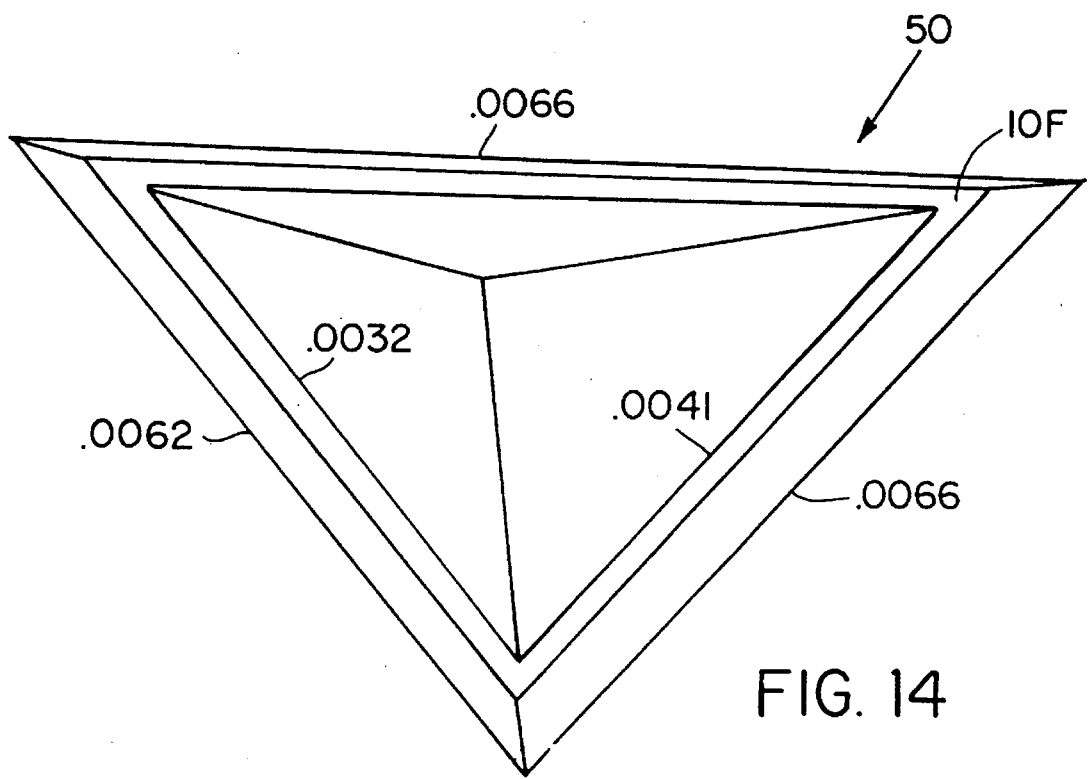
FIG. 14 is a dimensional view of the prism of FIG. 13 modified in accordance with the invention to form a 0.0041 inch smaller prism 50 with flats 10F on all three sides thereof.
Figure 15:
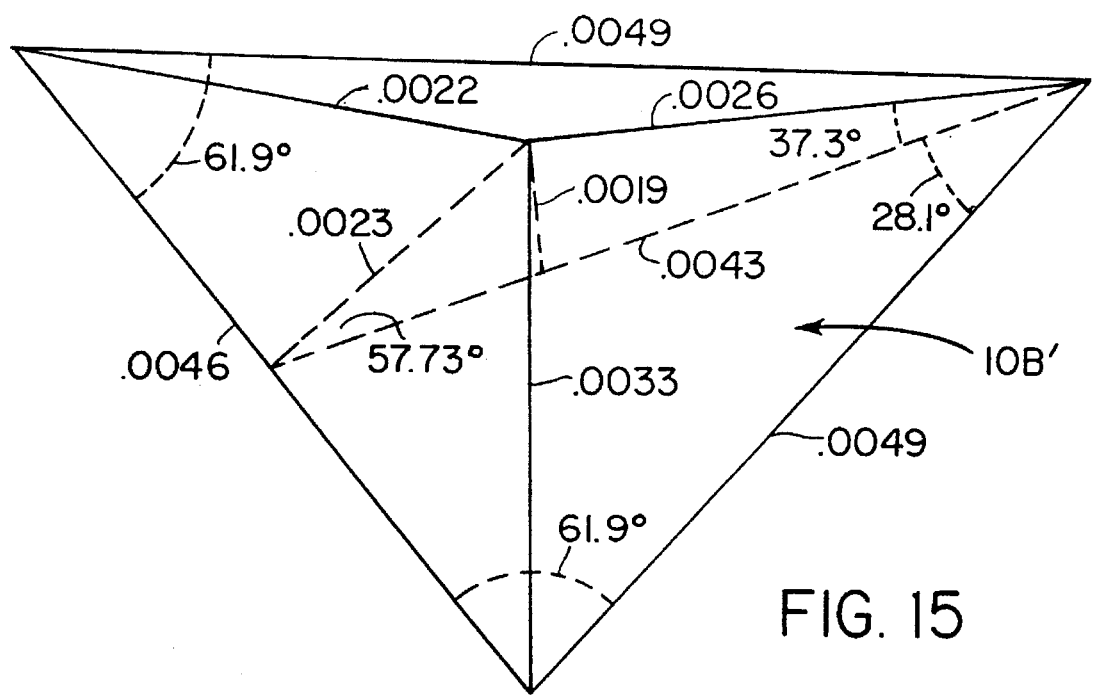
FIG. 15 is a dimensional perspective of another prism embodiment.
Figure 16:
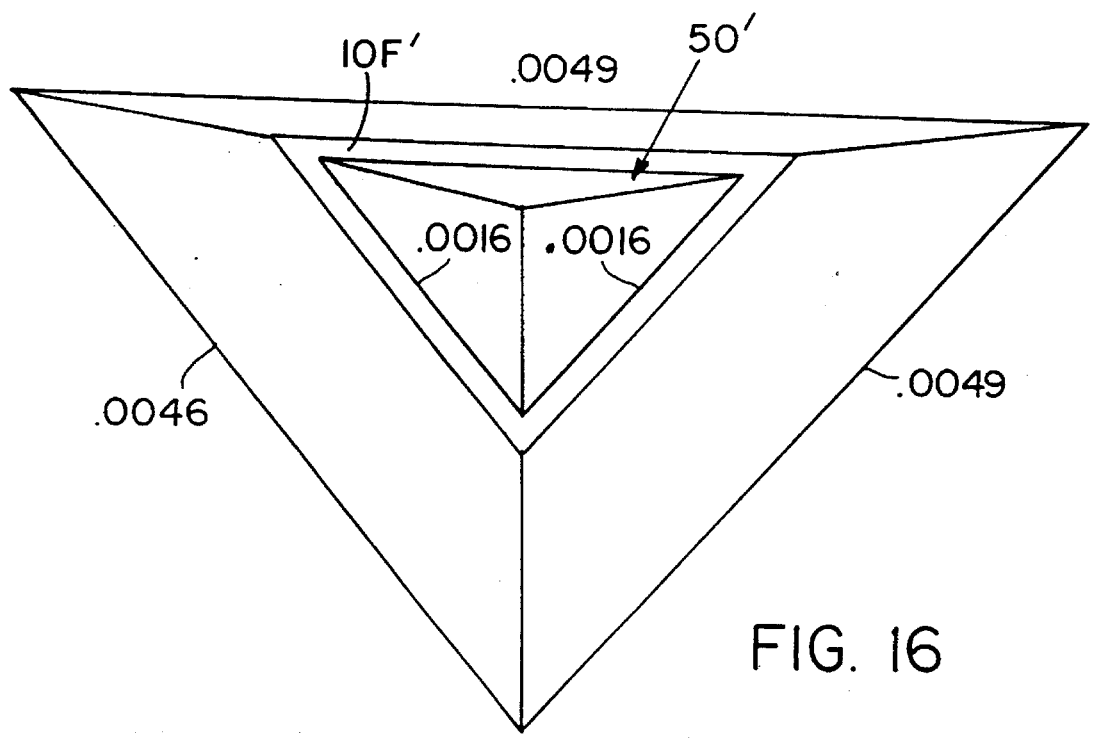
FIG. 16 illustrates the prism 10B' of FIG. 15 modified to form a 0.0016 size prism 50' with flats 10F' on all sides.

Polar plots of the light intensity, in $cd/lux/m^2$, plotted at various observation angles of retroreflectors made in accordance with the invention are shown in FIGS. 11A–D and FIGS. 12A–D. FIGS. 11A and 11B and 12A and 12B are plots for 0.0055 inch and 0.004 inch prisms, respectively, without windows at respective observation angles of 0.33° and 0.50°. FIGS. 11C and 11D and 12C and 12D are similar plots for 0.0055 inch and 0.004 inch prism size retroreflectors with windows. The improvement in the observation angle performance at a 0.33 degree observation angle is clearly seen by comparing FIG. 11B and FIG. 11D as the cube corner size is decreased by the addition of windows. FIG. 11D shows the improvement at 0.33° observation angle for the prism configuration of FIG. 14 and FIG. 12D shows the improvement at 0.50° degrees, obtained by the embodiment of FIG. 16. However, there is a minimum prism size, i.e., about 0.004 inch for the first cut and about 0.001 inch prism size created by the second cut which produces an optimum narrow and wide observation angle result.

The above articles produce excellent entrance angle performance as can be seen by the plots in FIGS. 11C, 11D, 12C and 12D.

Tables I and II, which follow, compare the brightness in $cd/lux/m^2$ of 0.0055 inch prisms with 3° negative tilt and metal backing. In Table I, no windows have been added. In Table II, the same tooling that was used to make the sheeting in Table I was used, but windows 10F were formed in accordance with the invention shown in FIGS. 10 and 14. The plus signs opposite certain data in Table II show where an increase in brightness occurred over the sample in Table I as a result of the smaller 0.004 prisms created when the windows were formed. Tables III and V show even better results for 0.0014 to 0.0016 size prisms of FIG. 16 formed in a first cut.

In summary, by forming small cube corners and window faces in prism pairs with optical axes tilted away from each other by small amounts the effects of diffraction and retroreflection are combined to optimize the retroreflective pattern of light.

Utilizing very small air backed and metallized prisms for creating retroreflective articles with the above optimum retroreflective light distribution results in very thin and therefore highly durable retroreflective articles.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

TABLE I

| Observation Angle | Entrance Angle | Orientation Angle | | | | | | | | | | | |
|---|---|---|---|---|---|---|---|---|---|---|---|---|---|
| | | 0 | 15 | 30 | 45 | 60 | 75 | 90 | 105 | 120 | 135 | 150 | 165 |
| 0.10 | 5 | 2309.00 | 2305.00 | 2286.00 | 2279.00 | 2278.00 | 2270.00 | 2287.00 | 2312.00 | 2326.00 | 2333.00 | 2329.00 | 2319.00 |
| | 10 | 2166.00 | 2155.00 | 2148.00 | 2141.00 | 2157.00 | 2161.00 | 2183.00 | 2208.00 | 2223.00 | 2223.00 | 2214.00 | 2188.00 |
| | 20 | 1654.00 | 1654.00 | 1657.00 | 1671.00 | 1703.00 | 1743.00 | 1780.00 | 1793.00 | 1791.00 | 1780.00 | 1754.00 | 1719.00 |
| | 30 | 1083.00 | 1065.00 | 1049.00 | 1063.00 | 1094.00 | 1145.00 | 1172.00 | 1180.00 | 1153.00 | 1135.00 | 1138.00 | 1135.00 |
| | 40 | 586.00 | 551.50 | 509.70 | 502.20 | 521.80 | 553.60 | 583.00 | 577.00 | 549.10 | 536.10 | 562.60 | 604.20 |
| | 45 | 397.00 | 360.40 | 308.80 | 303.50 | 317.40 | 340.70 | 362.70 | 357.40 | 331.40 | 318.10 | 348.50 | 403.00 |
| | 50 | 246.90 | 213.90 | 155.30 | 152.90 | 165.90 | 179.60 | 192.40 | 189.10 | 169.40 | 157.20 | 180.30 | 241.30 |
| | 60 | 93.11 | 72.46 | 29.51 | 26.08 | 39.04 | 40.65 | 39.17 | 42.36 | 37.94 | 25.74 | 43.80 | 83.06 |
| 0.20 | 5 | 1409.00 | 1375.00 | 1337.00 | 1299.00 | 1288.00 | 1290.00 | 1319.00 | 1358.00 | 1402.00 | 1427.00 | 1423.00 | 1408.00 |
| | 10 | 1359.00 | 1327.00 | 1294.00 | 1262.00 | 1250.00 | 1261.00 | 1289.00 | 1334.00 | 1374.00 | 1391.00 | 1378.00 | 1345.00 |
| | 20 | 1125.00 | 1118.00 | 1108.00 | 1094.00 | 1097.00 | 1113.00 | 1140.00 | 1179.00 | 1205.00 | 1205.00 | 1168.00 | 1114.00 |
| | 30 | 754.50 | 767.80 | 787.80 | 788.60 | 798.40 | 830.60 | 853.60 | 881.80 | 878.90 | 867.20 | 837.20 | 778.20 |
| | 40 | 414.80 | 411.90 | 416.50 | 420.50 | 426.60 | 450.10 | 480.10 | 482.10 | 462.50 | 455.40 | 454.90 | 439.00 |
| | 45 | 292.60 | 278.60 | 262.60 | 264.20 | 269.10 | 289.80 | 313.50 | 310.60 | 289.10 | 261.90 | 295.00 | 305.90 |
| | 50 | 189.90 | 171.50 | 138.20 | 137.90 | 146.20 | 158.50 | 173.70 | 170.60 | 151.90 | 143.70 | 159.80 | 192.20 |
| | 60 | 80.70 | 63.56 | 27.71 | 24.72 | 36.19 | 37.87 | 37.41 | 40.11 | 35.36 | 24.52 | 41.52 | 73.37 |
| 0.33 | 5 | 389.90 | 357.50 | 325.60 | 303.70 | 294.00 | 302.20 | 324.40 | 357.10 | 391.00 | 409.20 | 408.90 | 393.20 |
| | 10 | 419.70 | 384.60 | 346.60 | 318.80 | 312.50 | 316.80 | 335.30 | 369.10 | 403.70 | 416.80 | 412.80 | 398.60 |
| | 20 | 453.70 | 432.50 | 401.80 | 377.40 | 374.00 | 367.90 | 370.40 | 417.00 | 456.70 | 450.30 | 421.10 | 403.00 |
| | 30 | 353.10 | 365.10 | 393.50 | 400.50 | 400.00 | 398.60 | 399.00 | 446.60 | 474.40 | 454.60 | 397.70 | 333.50 |
| | 40 | 187.80 | 204.30 | 246.50 | 266.40 | 263.90 | 272.20 | 308.80 | 324.70 | 323.80 | 316.00 | 275.20 | 200.20 |
| | 45 | 137.00 | 147.40 | 172.70 | 184.80 | 182.10 | 193.90 | 213.20 | 217.20 | 205.80 | 202.90 | 186.30 | 150.70 |
| | 50 | 101.80 | 103.00 | 105.60 | 109.70 | 111.40 | 121.30 | 136.90 | 135.70 | 120.20 | 117.80 | 119.00 | 110.10 |
| | 60 | 57.55 | 47.09 | 24.36 | 21.76 | 30.39 | 32.17 | 33.56 | 35.21 | 30.03 | 21.99 | 36.28 | 53.83 |
| 0.50 | 5 | 50.17 | 50.25 | 47.86 | 47.95 | 58.51 | 80.81 | 100.50 | 97.25 | 78.85 | 64.34 | 59.76 | 58.64 |
| | 10 | 59.27 | 52.05 | 42.18 | 42.29 | 55.60 | 73.68 | 87.89 | 85.24 | 71.46 | 56.81 | 55.88 | 64.74 |
| | 20 | 116.50 | 83.98 | 41.74 | 37.37 | 52.03 | 54.02 | 51.56 | 59.55 | 64.80 | 50.70 | 53.44 | 92.81 |
| | 30 | 150.00 | 112.40 | 74.45 | 87.73 | 105.80 | 90.89 | 67.06 | 103.70 | 133.20 | 101.00 | 75.55 | 107.70 |
| | 40 | 80.67 | 78.46 | 89.98 | 120.20 | 133.30 | 123.30 | 109.90 | 141.80 | 165.50 | 140.00 | 87.60 | 69.23 |
| | 45 | 43.39 | 52.35 | 80.06 | 102.50 | 106.80 | 106.00 | 106.10 | 123.40 | 130.00 | 118.60 | 78.84 | 45.44 |
| | 50 | 28.18 | 36.49 | 60.00 | 70.08 | 70.50 | 74.98 | 84.09 | 87.55 | 81.51 | 80.74 | 62.62 | 33.45 |
| | 60 | 27.94 | 25.38 | 18.75 | 16.77 | 21.22 | 23.13 | 26.66 | 26.77 | 21.43 | 17.71 | 26.90 | 27.36 |
| 1.00 | 5 | 38.98 | 24.34 | 19.63 | 21.00 | 37.07 | 34.62 | 36.22 | 38.21 | 38.79 | 21.18 | 22.17 | 32.98 |
| | 10 | 47.53 | 25.67 | 19.67 | 24.54 | 37.37 | 40.57 | 37.38 | 40.16 | 37.63 | 24.56 | 21.58 | 36.00 |
| | 20 | 58.15 | 35.44 | 21.28 | 33.31 | 38.29 | 43.74 | 37.06 | 47.64 | 39.59 | 35.80 | 22.68 | 39.16 |
| | 30 | 21.92 | 18.47 | 23.09 | 34.16 | 32.91 | 35.81 | 35.15 | 47.26 | 38.43 | 36.77 | 21.26 | 16.40 |
| | 40 | 40.77 | 23.46 | 12.03 | 11.12 | 12.22 | 10.75 | 15.79 | 13.96 | 15.11 | 11.60 | 15.48 | 20.07 |
| | 45 | 30.04 | 20.53 | 7.93 | 12.27 | 28.41 | 17.54 | 8.19 | 16.55 | 33.64 | 12.17 | 11.45 | 18.13 |
| | 50 | 12.91 | 11.90 | 6.08 | 14.07 | 31.62 | 22.88 | 8.00 | 19.72 | 36.86 | 17.44 | 6.91 | 11.13 |
| | 60 | 1.89 | 3.60 | 4.66 | 5.52 | 6.02 | 6.82 | 7.56 | 7.92 | 6.96 | 8.16 | 5.88 | 1.94 |
| 1.50 | 5 | 36.31 | 10.34 | 8.72 | 10.29 | 24.52 | 18.39 | 12.53 | 18.37 | 30.81 | 11.74 | 8.57 | 15.90 |
| | 10 | 34.68 | 9.69 | 8.54 | 10.58 | 27.41 | 16.87 | 12.69 | 17.05 | 32.06 | 11.81 | 8.27 | 13.46 |
| | 20 | 24.45 | 9.93 | 9.41 | 8.55 | 20.73 | 10.94 | 11.79 | 13.17 | 26.16 | 11.58 | 9.49 | 10.80 |
| | 30 | 27.63 | 12.27 | 8.53 | 8.31 | 10.78 | 11.53 | 9.50 | 13.40 | 12.26 | 10.92 | 10.53 | 12.64 |
| | 40 | 12.94 | 9.07 | 5.67 | 8.55 | 15.27 | 13.44 | 4.91 | 13.99 | 16.91 | 9.15 | 7.78 | 9.00 |
| | 45 | 18.24 | 6.82 | 6.23 | 3.74 | 3.52 | 5.08 | 3.82 | 6.29 | 4.43 | 4.79 | 7.06 | 8.25 |
| | 50 | 9.04 | 4.56 | 5.81 | 3.27 | 10.33 | 4.81 | 4.49 | 4.04 | 11.75 | 3.66 | 5.30 | 5.14 |
| | 60 | 1.48 | 4.88 | 2.92 | 3.47 | 5.65 | 4.87 | 2.68 | 3.71 | 6.50 | 4.77 | 3.66 | 1.74 |
| 2.00 | 5 | 17.14 | 5.94 | 5.69 | 5.70 | 10.80 | 9.93 | 6.30 | 11.08 | 13.10 | 6.10 | 5.11 | 7.61 |
| | 10 | 16.37 | 4.90 | 4.54 | 5.60 | 10.77 | 7.97 | 4.88 | 9.77 | 13.22 | 5.74 | 3.99 | 6.01 |
| | 20 | 16.09 | 5.31 | 3.23 | 4.73 | 12.30 | 6.84 | 4.69 | 8.21 | 15.39 | 5.77 | 3.55 | 5.80 |
| | 30 | 12.05 | 6.24 | 3.54 | 4.12 | 9.74 | 4.48 | 5.29 | 5.71 | 12.17 | 4.70 | 4.64 | 5.65 |
| | 40 | 7.20 | 4.01 | 4.47 | 2.09 | 6.60 | 4.88 | 4.20 | 3.70 | 6.53 | 2.68 | 5.07 | 3.62 |
| | 45 | 7.78 | 2.55 | 4.62 | 2.60 | 8.18 | 5.20 | 4.18 | 4.80 | 9.24 | 2.83 | 4.85 | 2.28 |
| | 50 | 6.60 | 2.65 | 4.22 | 1.48 | 2.19 | 2.80 | 2.50 | 3.20 | 2.85 | 1.87 | 5.38 | 2.27 |
| | 60 | 1.23 | 4.72 | 2.83 | 1.87 | 4.74 | 2.68 | 2.87 | 1.73 | 5.37 | 2.17 | 2.64 | 1.12 |

TABLE II

| Observation Angle | Entrance Angle | Orientation Angle | | | | | | | | | | | |
|---|---|---|---|---|---|---|---|---|---|---|---|---|---|
| | | 0 | 15 | 30 | 45 | 60 | 75 | 90 | 105 | 120 | 135 | 150 | 165 |
| 0.10 | 5+ | 2097.00− | 2089.00− | 2074.00 | 2046.00− | 2014.00− | 1999.00− | 1982.00− | 1989.00− | 2003.00− | 2021.00− | 2044.00− | 2051.00− |
| | 10− | 1964.00− | 1956.00− | 1939.00− | 1911.00− | 1882.00− | 1860.00− | 1850.00− | 1856.00− | 1872.00− | 1879.00− | 1890.00− | 1889.00− |
| | 20− | 1450.00− | 1452.00− | 1444.00− | 1430.00− | 1412.00− | 1398.00− | 1388.00− | 1387.00− | 1391.00− | 1396.00− | 1391.00− | 1374.00 |
| | 30− | 855.90− | 856.30− | 859.90− | 858.30− | 859.30− | 863.70− | 863.00− | 845.60− | 827.90− | 818.00− | 819.80− | 811.80 |
| | 40− | 414.50− | 409.60− | 399.30− | 393.00− | 405.00− | 421.00− | 423.70− | 405.70− | 375.60− | 361.70− | 377.70− | 397.00 |
| | 45+ | 270.60− | 263.10− | 245.70− | 239.50− | 251.10− | 265.50− | 268.30− | 252.30− | 227.80− | 215.10− | 231.40− | 259.30 |
| | 50− | 171.20− | 158.10− | 137.40− | 131.60− | 140.00− | 150.00− | 151.20− | 140.00− | 123.40− | 113.30− | 125.90− | 155.90 |
| | 60+ | 65.23− | 56.89 | +30.63+ | 27.20− | 34.99− | 36.93− | 34.45− | 34.03− | 30.15− | 21.82− | 27.57− | 53.64 |
| 0.20 | 5− | 1363.00− | 1339.00− | 1293.00 | 1230.00− | 1172.00− | 1135.00− | 1127.00− | 1152.00− | 1196.00− | 1243.00− | 1289.00− | 1315.00 |
| | 10+ | 1301.00− | 1279.00− | 1233.00− | 1179.00− | 1131.00− | 1097.00− | 1093.00− | 1116.00− | 1159.00− | 1197.00− | 1221.00− | 1230.00 |
| | 20− | 1032.00− | 1022.00− | 1001.00− | 977.70− | 955.50− | 935.70− | 932.10− | 948.60− | 975.40− | 987.00− | 979.50− | 962.10 |
| | 30− | 664.70− | 662.70− | 664.80− | 659.70− | 658.50− | 662.30− | 662.80− | 657.00− | 650.60− | 647.20− | 644.30− | 625.80 |
| | 40+ | 338.10− | 338.70− | 340.60− | 335.90− | 343.80− | 358.00− | 360.40− | 345.50− | 320.10− | 311.40− | 324.10− | 327.50 |
| | 45− | 221.40− | 218.20− | 213.30− | 210.00− | 218.10− | 231.30− | 234.00− | 219.20− | 197.00− | 188.30− | 204.50− | 218.40 |
| | 50− | 144.00− | 135.20− | 124.50− | 121.40− | 127.90− | 138.00− | 140.20− | 129.20− | 112.80− | 104.80− | 115.70− | 136.00 |
| | 60+ | 58.84− | 52.58+ | 28.78+ | 26.20− | 33.24− | 35.30− | 33.39− | 32.72− | 28.59− | 20.92− | 26.53− | 49.69 |
| 0.33 | 5+ | 507.60+ | 483.20+ | 431.90+ | 372.20+ | 328.70+ | 310.00+ | 315.00+ | 332.70+ | 364.10+ | 407.10+ | 454.10+ | 485.30 |
| | 10+ | 525.80+ | 493.90+ | 433.80+ | 381.70+ | 345.80+ | 327.30+ | 330.70+ | 351.20+ | 385.20+ | 422.30+ | 457.40+ | 487.50 |
| | 20+ | 528.30+ | 494.60+ | 435.30+ | 402.90+ | 392.40+ | 379.10+ | 374.00+ | 396.90+ | 428.70+ | 442.10+ | 452.00+ | 471.80 |
| | 30+ | 411.80+ | 396.60+ | 373.30+ | 361.80+ | 372.00+ | 370.80+ | 364.60+ | 375.90+ | 387.20+ | 384.10+ | 381.50+ | 375.10 |
| | 40+ | 224.60+ | 227.80+ | 237.00+ | 234.90+ | 242.50+ | 254.10+ | 254.00+ | 247.80+ | 233.60+ | 230.50+ | 235.10+ | 222.90 |
| | 45+ | 147.60+ | 150.20+ | 159.40+ | 160.80+ | 166.50+ | 178.30+ | 180.70+ | 170.00+ | 153.90+ | 150.80+ | 157.50+ | 153.00 |
| | 50+ | 97.87− | 95.22+ | 97.57+ | 99.15− | 103.30− | 113.10− | 116.30− | 106.80− | 92.52− | 88.46+ | 95.76− | 100.90 |
| | 60+ | 46.30+ | 44.01+ | 24.89+ | 23.59− | 29.19− | 31.47− | 30.70− | 29.65− | 25.20− | 18.97− | 24.10− | 41.58 |
| 0.50 | 5+ | 145.30+ | 132.30+ | 104.20+ | 71.82+ | 67.58+ | 93.09+ | 116.70+ | 111.10+ | 87.69+ | 85.07+ | 116.30+ | 143.00 |
| | 10+ | 151.20+ | 132.30+ | 99.96+ | 70.62+ | 66.26+ | 86.15+ | 104.30+ | 101.70+ | 84.56+ | 83.47+ | 116.60+ | 147.70 |
| | 20+ | 196.20+ | 161.10+ | 106.70+ | 79.43+ | 78.32+ | 83.77+ | 85.91+ | 94.06+ | 96.43+ | 97.58+ | 126.80+ | 171.90 |
| | 30+ | 215.80+ | 177.90+ | 124.50+ | 111.70+ | 127.50+ | 125.10+ | 111.80+ | 129.70+ | 145.70+ | 139.60+ | 145.70+ | 172.50 |
| | 40+ | 130.30+ | 123.00+ | 113.70+ | 116.60+ | 130.90+ | 134.70+ | 122.50+ | 132.00+ | 136.00+ | 132.10+ | 125.50+ | 118.80 |
| | 45+ | 82.16+ | 83.60+ | 89.17+ | 95.88+ | 104.70+ | 111.20+ | 106.00+ | 106.40+ | 102.30+ | 100.90+ | 97.07+ | 86.19 |
| | 50+ | 50.94+ | 52.56+ | 60.81− | 66.84+ | 70.79+ | 78.50+ | 79.08+ | 74.26+ | 65.69+ | 65.20+ | 65.89+ | 58.88 |
| | 60+ | 28.78+ | 30.75+ | 18.57+ | 18.78+ | 22.29+ | 24.97− | 25.65− | 24.00− | 19.49+ | 15.63− | 19.71+ | 29.19 |
| 1.00 | 5+ | 76.00+ | 32.23+ | 23.44+ | 18.89+ | 33.83+ | 23.78+ | 27.55+ | 29.42+ | 38.89+ | 23.17− | 23.41+ | 33.35 |
| | 10+ | 71.70+ | 33.27+ | 19.17+ | 18.84− | 34.75+ | 23.68+ | 24.03− | 27.92+ | 39.63− | 22.62− | 20.82− | 32.99 |
| | 20+ | 61.60+ | 37.57+ | 14.29+ | 20.14− | 33.07+ | 26.00+ | 20.76+ | 26.87+ | 41.24+ | 25.53− | 18.41− | 33.27 |
| | 30+ | 41.55+ | 27.52+ | 15.28+ | 21.45+ | 33.51+ | 29.51+ | 23.82+ | 28.16+ | 38.91+ | 25.53+ | 19.09+ | 28.28 |
| | 40+ | 55.62+ | 31.41+ | 11.93+ | 14.25+ | 20.66+ | 19.08+ | 10.13+ | 15.05+ | 21.19+ | 21.05+ | 16.84+ | 27.20 |
| | 45+ | 39.98+ | 24.86+ | 11.41+ | 15.28+ | 28.44+ | 23.06+ | 8.92+ | 18.02− | 29.91+ | 25.55+ | 16.11+ | 19.16 |
| | 50+ | 16.87+ | 14.35+ | 11.13+ | 15.38+ | 27.90+ | 24.30+ | 11.74+ | 18.64+ | 28.10+ | 24.94+ | 15.08+ | 10.88 |
| | 60+ | 4.00+ | 22.31+ | 6.15+ | 6.85+ | 7.94+ | 9.80+ | 9.91+ | 8.88+ | 7.27+ | 8.03+ | 8.07+ | 6.88 |
| 1.50 | 5− | 22.51+ | 10.10+ | 11.51+ | 7.19+ | 13.33+ | 12.54+ | 11.54+ | 13.40+ | 15.64+ | 8.46+ | 12.51+ | 9.88 |
| | 10− | 23.27+ | 9.31+ | 10.91+ | 7.52− | 12.59+ | 11.70+ | 10.69+ | 12.42+ | 14.96+ | 8.45+ | 11.47− | 9.49 |
| | 20− | 25.02− | 10.08+ | 9.00+ | 7.75− | 12.72+ | 8.81− | 10.19+ | 10.14+ | 15.70− | 8.03+ | 9.63− | 9.91 |
| | 30+ | 26.90+ | 8.15+ | 5.42+ | 5.82+ | 12.62+ | 7.09+ | 7.13+ | 6.31+ | 15.24+ | 5.94+ | 6.80+ | 6.98 |
| | 40+ | 14.52− | 5.88+ | 6.02+ | 5.05− | 12.32+ | 7.90+ | 6.06+ | 6.61+ | 13.84+ | 6.15− | 6.85+ | 5.58 |
| | 45+ | 21.01− | 6.79+ | 6.31+ | 4.56+ | 7.36+ | 6.09+ | 5.05+ | 4.95+ | 7.24+ | 6.10+ | 7.54+ | 6.78 |
| | 50+ | 13.25+ | 6.46+ | 5.30+ | 5.09+ | 11.67+ | 8.19+ | 3.51+ | 5.04+ | 12.14+ | 8.41+ | 6.59+ | 6.14 |

TABLE II-continued

| Observation Angle | Entrance Angle | Orientation Angle | | | | | | | | | | | |
|---|---|---|---|---|---|---|---|---|---|---|---|---|---|
| | | 0 | 15 | 30 | 45 | 60 | 75 | 90 | 105 | 120 | 135 | 150 | 165 |
| 2.00 | 60+ | 2.13+ | 39.30+ | 3.25+ | 3.67+ | 5.95+ | 5.61+ | 3.14- | 3.48- | 5.37+ | 5.70+ | 3.71+ | 3.12 |
| | 5- | 12.04- | 3.69- | 3.87- | 2.91- | 7.02- | 5.25- | 6.00- | 5.36- | 7.89- | 3.17- | 4.21- | 3.51 |
| | 10- | 11.38- | 3.33- | 3.34- | 3.11- | 7.07- | 4.87+ | 5.04- | 4.83- | 7.94- | 3.22- | 3.71- | 3.46 |
| | 20- | 12.58- | 4.46- | 2.50+ | 3.08+ | 6.05- | 4.26- | 3.25- | 4.35- | 8.05+ | 3.60- | 2.98- | 5.18 |
| | 30- | 14.15- | 4.19- | 2.60 | 4.12- | 6.41- | 3.48- | 3.71- | 4.31- | 8.40+ | 4.53- | 2.74- | 4.08 |
| | 40- | 6.88- | 2.75- | 1.98+ | 2.41+ | 6.61- | 2.80- | 1.92- | 2.25+ | 8.99+ | 2.07+ | 1.85- | 2.83 |
| | 45+ | 9.59- | 2.52- | 2.14- | 2.11+ | 6.81- | 3.00- | 2.08- | 2.44+ | 7.59+ | 2.10+ | 2.24+ | 2.77 |
| | 50+ | 9.49- | 2.04- | 2.88+ | 1.80+ | 3.55- | 2.14+ | 2.54- | 1.76+ | 3.53+ | 2.24- | 3.32- | 2.02 |
| | 60+ | 1.36+ | 50.40- | 2.02+ | 2.67+ | 5.06+ | 3.66- | 2.01- | 2.01- | 4.78+ | 3.58- | 2.35+ | 3.31 |

+= Area where gain occurred.

TABLE III

| Observation Angle | Entrance Angle (β1) | Orientation Angle | | | | | | | | | | | |
|---|---|---|---|---|---|---|---|---|---|---|---|---|---|
| | | 0 | 15 | 30 | 45 | 60 | 75 | 90 | 105 | 120 | 135 | 150 | 165 |
| 0.10 | 5 | 2536.00 | 2538.00 | 2527.00 | 2498.00 | 2469.00 | 2439.00 | 2418.00 | 2407.00 | 2411.00 | 2435.00 | 2457.00 | 2485.00 |
| | 10 | 2400.00 | 2400.00 | 2388.00 | 2375.00 | 2333.00 | 2308.00 | 2275.00 | 2251.00 | 2247.00 | 2263.00 | 2282.00 | 2312.00 |
| | 20 | 1862.00 | 1853.00 | 1851.00 | 1851.00 | 1831.00 | 1791.00 | 1748.00 | 1715.00 | 1688.00 | 1702.00 | 1712.00 | 1735.00 |
| | 30 | 1181.00 | 1159.00 | 1146.00 | 1149.00 | 1141.00 | 1106.00 | 1057.00 | 1039.00 | 1022.00 | 1028.00 | 1058.00 | 1101.00 |
| | 40 | 603.30 | 584.80 | 561.40 | 539.20 | 525.50 | 518.70 | 505.80 | 484.80 | 463.20 | 483.60 | 519.00 | 555.70 |
| | 45 | 400.60 | 384.40 | 354.30 | 327.20 | 318.00 | 320.20 | 313.20 | 297.90 | 278.00 | 292.10 | 327.30 | 362.10 |
| | 50 | 251.10 | 232.40 | 204.50 | 178.50 | 172.30 | 179.60 | 181.50 | 167.60 | 153.70 | 158.30 | 185.30 | 214.10 |
| | 60 | 90.98 | 96.81 | 47.51 | 33.20 | 36.75 | 40.39 | 39.38 | 38.97 | 35.26 | 29.55 | 42.24 | 72.55 |
| 0.20 | 5 | 1836.00 | 1837.00 | 1801.00 | 1752.00 | 1690.00 | 1627.00 | 1582.00 | 1573.00 | 1605.00 | 1663.00 | 1743.00 | 1809.00 |
| | 10 | 1746.00 | 1737.00 | 1724.00 | 1696.00 | 1641.00 | 1576.00 | 1516.00 | 1493.00 | 1520.00 | 1573.00 | 1639.00 | 1715.00 |
| | 20 | 1381.00 | 1378.00 | 1390.00 | 1415.00 | 1406.00 | 1333.00 | 1256.00 | 1230.00 | 1239.00 | 1267.00 | 1306.00 | 1366.00 |
| | 30 | 907.40 | 901.70 | 922.20 | 960.40 | 965.60 | 914.20 | 854.70 | 835.40 | 834.50 | 848.60 | 872.80 | 906.30 |
| | 40 | 482.80 | 474.50 | 484.10 | 487.20 | 478.60 | 468.90 | 448.20 | 427.90 | 410.40 | 432.50 | 458.10 | 475.00 |
| | 45 | 323.40 | 315.10 | 309.30 | 299.40 | 293.00 | 293.40 | 285.00 | 269.20 | 250.80 | 266.80 | 296.30 | 312.70 |
| | 50 | 207.20 | 197.40 | 184.20 | 168.40 | 163.50 | 169.80 | 172.00 | 157.40 | 143.70 | 150.20 | 172.00 | 188.70 |
| | 60 | 83.32 | 91.09 | 44.66 | 32.46 | 35.79 | 39.51 | 38.67 | 38.10 | 34.25 | 29.08 | 40.95 | 69.41 |
| 0.33 | 5 | 836.80 | 823.10 | 776.30 | 716.90 | 652.30 | 587.10 | 551.40 | 551.20 | 587.30 | 652.90 | 734.50 | 819.10 |
| | 10 | 817.70 | 802.10 | 763.90 | 740.00 | 689.20 | 610.00 | 550.40 | 552.40 | 598.40 | 656.10 | 726.10 | 819.50 |
| | 20 | 734.60 | 708.50 | 697.80 | 748.70 | 755.30 | 652.50 | 557.90 | 563.60 | 616.90 | 645.10 | 675.70 | 761.90 |
| | 30 | 540.60 | 526.40 | 553.70 | 633.70 | 663.30 | 586.20 | 506.20 | 509.20 | 534.30 | 550.60 | 545.10 | 572.20 |
| | 40 | 293.70 | 299.40 | 340.10 | 381.10 | 389.70 | 366.40 | 336.20 | 320.40 | 313.90 | 336.50 | 336.80 | 325.90 |
| | 45 | 200.10 | 206.00 | 231.80 | 249.30 | 249.10 | 245.00 | 231.90 | 217.30 | 204.40 | 222.00 | 229.40 | 217.50 |
| | 50 | 135.60 | 135.10 | 144.40 | 147.00 | 144.30 | 148.70 | 149.20 | 134.70 | 122.80 | 131.20 | 141.70 | 138.10 |
| | 60 | 66.25 | 79.21 | 38.47 | 30.38 | 33.21 | 36.80 | 36.51 | 35.45 | 31.37 | 27.26 | 37.01 | 60.94 |
| 0.50 | 5 | 158.50 | 142.20 | 109.40 | 96.41 | 111.30 | 132.10 | 140.40 | 125.70 | 103.30 | 90.86 | 96.83 | 124.30 |
| | 10 | 197.30 | 164.90 | 119.30 | 114.40 | 123.20 | 119.90 | 113.90 | 110.30 | 111.70 | 108.60 | 108.40 | 142.00 |
| | 20 | 279.50 | 218.00 | 155.50 | 188.00 | 213.70 | 142.80 | 98.49 | 124.90 | 174.20 | 175.10 | 152.60 | 206.10 |
| | 30 | 269.20 | 218.00 | 190.30 | 266.60 | 321.30 | 227.50 | 158.90 | 195.80 | 246.20 | 244.60 | 191.90 | 226.00 |
| | 40 | 142.50 | 138.50 | 162.80 | 228.30 | 263.10 | 223.00 | 179.00 | 181.40 | 196.80 | 206.00 | 169.20 | 156.20 |
| | 45 | 88.43 | 95.80 | 127.80 | 171.70 | 185.70 | 171.40 | 149.20 | 143.00 | 142.50 | 154.70 | 133.30 | 111.00 |
| | 50 | 57.93 | 63.43 | 87.18 | 110.90 | 114.10 | 114.40 | 110.40 | 99.03 | 91.62 | 100.50 | 92.51 | 72.97 |
| | 60 | 40.98 | 60.49 | 28.04 | 26.28 | 28.26 | 31.73 | 32.03 | 30.32 | 26.00 | 23.66 | 29.35 | 46.82 |
| 1.00 | 5 | 68.52 | 57.74 | 35.22 | 20.09 | 29.29 | 33.05 | 28.39 | 24.87 | 30.07 | 26.56 | 37.65 | 77.89 |
| | 10 | 63.86 | 59.27 | 34.79 | 30.23 | 41.97 | 48.04 | 32.15 | 29.84 | 36.74 | 33.58 | 39.80 | 84.78 |
| | 20 | 36.52 | 43.92 | 27.91 | 38.85 | 73.34 | 77.59 | 44.49 | 44.51 | 52.44 | 32.94 | 39.42 | 65.45 |
| | 30 | 46.55 | 30.41 | 19.92 | 21.75 | 32.49 | 39.46 | 28.45 | 21.50 | 17.36 | 14.33 | 28.36 | 38.55 |
| | 40 | 72.31 | 41.15 | 13.31 | 25.61 | 62.55 | 25.44 | 8.09 | 22.24 | 47.18 | 31.18 | 11.86 | 33.85 |
| | 45 | 44.48 | 31.01 | 11.57 | 31.31 | 73.86 | 38.10 | 11.30 | 31.32 | 56.56 | 38.62 | 8.64 | 26.41 |
| | 50 | 15.69 | 15.36 | 9.55 | 28.92 | 57.34 | 39.87 | 20.20 | 29.98 | 43.91 | 36.07 | 7.96 | 13.29 |
| | 60 | 2.88 | 38.42 | 4.79 | 11.45 | 13.38 | 15.23 | 14.34 | 13.11 | 10.98 | 11.91 | 7.06 | 24.33 |
| 1.50 | 5 | 29.57 | 9.36 | 9.35 | 8.93 | 10.21 | 9.78 | 7.78 | 11.54 | 10.19 | 10.24 | 8.43 | 12.43 |
| | 10 | 35.19 | 10.34 | 10.19 | 9.14 | 11.52 | 9.46 | 8.23 | 9.22 | 9.16 | 9.77 | 9.29 | 14.75 |
| | 20 | 28.03 | 13.92 | 7.92 | 5.68 | 10.40 | 8.20 | 9.49 | 7.00 | 8.56 | 5.84 | 8.22 | 16.34 |
| | 30 | 17.22 | 12.07 | 7.69 | 8.39 | 30.60 | 15.03 | 6.28 | 14.41 | 28.25 | 11.53 | 7.82 | 12.70 |
| | 40 | 26.01 | 8.40 | 7.31 | 7.16 | 6.95 | 8.31 | 6.89 | 5.40 | 4.91 | 4.54 | 7.98 | 6.13 |
| | 45 | 28.67 | 9.31 | 7.50 | 7.44 | 18.27 | 5.56 | 4.22 | 5.06 | 14.65 | 5.16 | 8.88 | 5.81 |
| | 50 | 12.79 | 7.34 | 6.47 | 8.23 | 30.81 | 12.16 | 4.57 | 9.37 | 24.94 | 10.04 | 7.34 | 4.69 |
| | 60 | 1.38 | 45.78 | 2.48 | 3.86 | 8.52 | 7.66 | 3.45 | 5.32 | 7.21 | 6.30 | 1.47 | 32.71 |
| 2.00 | 5 | 19.56 | 4.80 | 3.06 | 3.40 | 6.19 | 3.83 | 3.68 | 4.43 | 5.62 | 3.61 | 3.51 | 5.98 |
| | 10 | 19.88 | 4.39 | 3.48 | 4.07 | 8.50 | 3.98 | 2.93 | 4.14 | 6.40 | 3.78 | 3.46 | 5.68 |
| | 20 | 19.05 | 4.91 | 4.03 | 3.51 | 6.07 | 3.49 | 3.54 | 3.37 | 4.80 | 3.25 | 3.75 | 6.03 |
| | 30 | 17.14 | 4.43 | 3.87 | 2.64 | 5.89 | 3.33 | 4.32 | 3.40 | 5.34 | 2.71 | 4.18 | 5.43 |
| | 40 | 5.74 | 3.48 | 4.04 | 2.76 | 14.86 | 6.56 | 2.27 | 4.85 | 12.35 | 4.02 | 3.83 | 3.25 |
| | 45 | 15.68 | 3.36 | 4.46 | 2.73 | 3.17 | 3.54 | 2.08 | 2.53 | 2.56 | 2.76 | 3.02 | 3.54 |
| | 50 | 10.74 | 2.86 | 4.30 | 3.99 | 10.10 | 2.35 | 2.99 | 2.24 | 9.06 | 2.08 | 3.37 | 2.35 |
| | 60 | 0.96 | 44.65 | 2.58 | 2.66 | 7.63 | 4.70 | 1.41 | 2.93 | 6.85 | 3.44 | 2.35 | 29.96 |

All values have units of cd/lux/m$^3$

TABLE IV

| Observation Angle | Entrance Angle (β1) | Orientation Angle | | | | | | | | | | | |
|---|---|---|---|---|---|---|---|---|---|---|---|---|---|
| | | 0 | 15 | 30 | 45 | 60 | 75 | 90 | 105 | 120 | 135 | 150 | 165 |
| 0.10 | 5 | 1209.00 | 1204.00 | 1196.00 | 1186.00 | 1173.00 | 1160.00 | 1158.00 | 1158.00 | 1166.00 | 1177.00 | 1195.00 | 1203.00 |
| | 10 | 1141.00 | 1132.00 | 1121.00 | 1114.00 | 1107.00 | 1098.00 | 1094.00 | 1097.00 | 1104.00 | 1121.00 | 1134.00 | 1143.00 |
| | 20 | 868.30 | 867.00 | 862.40 | 865.40 | 864.20 | 858.20 | 850.20 | 857.30 | 873.40 | 883.90 | 890.10 | 895.80 |
| | 30 | 561.10 | 553.40 | 537.00 | 535.10 | 539.30 | 532.80 | 516.70 | 532.80 | 553.50 | 563.60 | 556.40 | 562.10 |
| | 40 | 284.50 | 273.10 | 257.60 | 257.70 | 255.60 | 246.60 | 239.50 | 246.30 | 266.30 | 274.80 | 269.10 | 273.50 |
| | 45 | 184.00 | 171.80 | 157.70 | 156.50 | 155.60 | 148.40 | 145.40 | 150.10 | 161.40 | 169.20 | 164.10 | 169.80 |
| | 50 | 110.70 | 102.20 | 89.76 | 88.25 | 87.51 | 83.98 | 85.02 | 85.55 | 89.93 | 95.38 | 92.87 | 100.20 |
| | 60 | 38.46 | 33.86 | 21.53 | 17.83 | 18.97 | 19.86 | 19.50 | 19.85 | 19.75 | 18.63 | 20.59 | 81.92+ |
| 0.20 | 5 | 874.70 | 876.40 | 854.70 | 824.00 | 790.80 | 763.90 | 748.30 | 751.70 | 770.90 | 800.00 | 827.10 | 853.80 |
| | 10 | 841.50 | 831.90 | 811.20 | 785.90 | 759.50 | 734.40 | 720.10 | 725.90 | 749.90 | 772.70 | 794.30 | 812.80 |
| | 20 | 675.00 | 669.60 | 647.10 | 644.50 | 642.50 | 619.60 | 598.40 | 614.80 | 650.10 | 661.50 | 649.90 | 654.10 |
| | 30 | 458.60 | 446.60 | 428.10 | 436.70 | 447.50 | 430.70 | 406.20 | 428.70 | 465.60 | 469.50 | 441.00 | 431.60 |
| | 40 | 240.30 | 229.20 | 218.40 | 227.60 | 230.40 | 218.70 | 210.60 | 218.30 | 243.20 | 249.80 | 230.90 | 224.10 |
| | 45 | 156.10 | 146.00 | 137.50 | 142.40 | 143.90 | 136.20 | 133.20 | 137.80 | 151.50 | 157.80 | 146.10 | 144.70 |
| | 50 | 95.25 | 88.01 | 79.84 | 82.24 | 82.67 | 78.96 | 80.15 | 80.58 | 85.19 | 90.91 | 85.42 | 88.51 |
| | 60 | 35.51 | 31.41 | 20.06 | 17.19 | 18.39 | 19.30 | 19.11 | 19.41 | 19.22 | 18.27 | 19.95 | 76.54+ |
| 0.33 | 5 | 424.90 | 427.20 | 402.40 | 372.90 | 345.10 | 328.70 | 322.40 | 329.00 | 338.80 | 346.80 | 363.70 | 394.20 |
| | 10 | 434.70 | 426.90 | 392.80 | 373.20 | 355.90 | 330.70 | 316.30 | 326.30 | 351.20 | 356.50 | 356.80 | 387.80 |
| | 20 | 417.80 | 398.00 | 348.50 | 354.90 | 369.50 | 329.60 | 295.30 | 317.80 | 370.50 | 366.90 | 326.80 | 349.90 |
| | 30 | 320.60 | 300.10 | 263.60 | 288.20 | 313.10 | 282.10 | 247.70 | 271.20 | 326.50 | 320.50 | 263.60 | 262.70 |
| | 40 | 171.90 | 161.80 | 151.70 | 171.10 | 184.20 | 169.10 | 158.10 | 165.90 | 196.20 | 198.30 | 162.60 | 150.50 |
| | 45 | 113.70 | 105.60 | 102.50 | 115.20 | 122.60 | 113.00 | 109.30 | 114.00 | 130.40 | 134.30 | 112.10 | 104.00 |
| | 50 | 69.95 | 64.69 | 61.95 | 69.72 | 72.68 | 68.80 | 70.16 | 70.37 | 76.12 | 81.05 | 70.44 | 66.92 |
| | 60 | 29.24 | 26.93 | 17.11 | 15.75 | 17.03 | 17.89 | 18.05 | 18.29 | 18.02 | 17.31 | 18.02 | 67.67+ |
| 0.50 | 5 | 142.30 | 148.80+ | 144.90+ | 139.90+ | 152.50+ | 193.90+ | 231.60+ | 222.00+ | 179.10+ | 142.70+ | 127.40+ | 134.80+ |
| | 10 | 162.30 | 159.00 | 146.60+ | 145.80+ | 150.00+ | 175.30+ | 209.00+ | 199.80+ | 168.10+ | 142.70+ | 129.20+ | 146.20+ |
| | 20 | 204.00 | 181.50 | 144.30 | 156.20 | 164.70 | 150.00+ | 158.80+ | 157.90+ | 165.30 | 152.80 | 130.00 | 161.50 |
| | 30 | 204.70 | 171.10 | 125.70 | 150.60 | 179.30 | 144.10 | 124.90 | 134.90 | 181.50 | 165.00 | 120.90 | 145.40 |
| | 40 | 119.00 | 105.10 | 105.50 | 131.20 | 109.70 | 103.30 | 132.10 | 139.30 | 132.10 | 91.65 | 92.34 | |
| | 45 | 75.60 | 68.02 | 85.81 | 105.50 | 93.77 | 80.79 | 96.82 | 103.30 | 100.80 | 98.10 | 69.50 | 64.41 |
| | 50 | 43.14 | 40.26 | 62.12 | 77.38 | 58.25 | 53.33 | 75.07 | 79.22 | 62.06 | 64.39 | 48.16 | 42.24 |
| | 60 | 20.29 | 22.19 | 39.78 | 50.78 | 14.57 | 15.31 | 53.82 | 53.93 | 15.60 | 15.34 | 14.68 | 56.87 |
| 1.00 | 5 | 48.14 | 42.68 | 12.70 | 13.19 | 58.37+ | 38.34+ | 15.97 | 16.03 | 50.32+ | 44.39+ | 25.35 | 33.85 |
| | 10 | 68.70+ | 56.58 | 29.04 | 34.56+ | 54.41+ | 44.42 | 33.12+ | 36.11+ | 45.78+ | 41.84+ | 26.85 | 40.31 |
| | 20 | 65.63+ | 61.31+ | 28.22+ | 40.83+ | 54.67 | 67.52 | 30.54 | 39.15+ | 57.53+ | 39.00+ | 25.90 | 43.44 |
| | 30 | 49.68+ | 38.64+ | 25.71+ | 39.30+ | 25.71 | 43.79+ | 30.34 | 50.04+ | 33.61+ | 23.92+ | 20.99 | 30.29 |
| | 40 | 51.39 | 28.66 | 26.91+ | 25.63+ | 34.94 | 21.26 | 23.31 | 38.00+ | 32.68 | 23.92+ | 24.86 | 19.37 |
| | 45 | 33.93 | 20.97 | 23.70+ | 22.54 | 39.69 | 23.13 | 21.02+ | 22.54 | 40.58 | 28.08 | 23.77 | 15.29 |
| | 50 | 14.45 | 12.39 | 17.27+ | 21.37 | 31.08 | 21.80 | 19.24+ | 21.16 | 33.40 | 25.58 | 18.51 | 11.60 |
| | 60 | 4.68+ | 19.74 | 5.81+ | 16.93 | 7.72 | 7.80 | 17.99 | 18.50 | 8.60 | 8.49 | 6.34 | 35.71+ |
| 1.50 | 5 | 37.06+ | 18.10+ | 11.41+ | 13.78+ | 21.51+ | 20.75+ | 8.33 | 8.09 | 22.12+ | 12.43+ | 14.49 | 9.62 |
| | 10 | 40.90+ | 20.43+ | 10.93+ | 11.70+ | 24.84+ | 19.65+ | 11.19+ | 14.09+ | 20.33+ | 11.59+ | 13.65+ | 11.03 |
| | 20 | 26.61 | 23.70+ | 10.36+ | 7.38+ | 15.80+ | 13.80+ | 11.49+ | 13.49+ | 18.85+ | 8.64+ | 9.31+ | 13.31 |
| | 30 | 25.01+ | 22.18+ | 16.95+ | 9.86+ | 17.42 | 14.06 | 10.11+ | 10.77+ | 20.74− | 11.24 | 10.58+ | 12.65 |
| | 40 | 24.16 | 17.81+ | 9.83+ | 8.10+ | 8.87+ | 13.19+ | 8.86+ | 11.22+ | 11.68+ | 9.76+ | 7.27 | 13.63+ |
| | 45 | 25.79 | 14.81+ | 7.41 | 8.09+ | 14.24 | 9.35+ | 7.72+ | 9.48+ | 12.11 | 9.93+ | 5.30 | 12.57+ |
| | 50 | 13.71+ | 8.65+ | 6.14 | 9.31+ | 16.98 | 9.23 | 4.07 5.26+ | 7.65+ 7.00 | 17.30 | 11.08+ | 6.42 | 7.00+ |

TABLE IV-continued

| Observation Angle | Entrance Angle (β1) | Orientation Angle | | | | | | | | | | | |
|---|---|---|---|---|---|---|---|---|---|---|---|---|---|
| | | 0 | 15 | 30 | 45 | 60 | 75 | 90 | 105 | 120 | 135 | 150 | 165 |
| 2.00 | 60 | 1.16 | 23.79 | 4.01+ | 3.96+ | 4.98 | 4.43 | 3.76+ | 3.79 | 5.96 | 5.08 | 4.65+ | 29.02 |
| | 5 | 14.77 | 6.01+ | 6.06+ | 4.74+ | 7.43+ | 6.78+ | 6.55+ | 5.43+ | 8.83+ | 5.63+ | 5.89+ | 4.37 |
| | 10 | 16.70 | 6.53+ | 5.57+ | 4.44+ | 8.29 | 5.23+ | 6.36+ | 3.90 | 10.91+ | 4.83+ | 5.54+ | 5.20 |
| | 20 | 19.03 | 8.48+ | 5.07+ | 4.39+ | 9.06+ | 5.41+ | 3.85+ | 4.13+ | 8.78+ | 3.77+ | 3.46− | 7.28+ |
| | 30 | 13.19 | 7.33+ | 4.29+ | 3.46+ | 7.47+ | 6.26+ | 3.88 | 4.75+ | 9.86+ | 4.19+ | 3.24 | 5.60+ |
| | 40 | 7.36+ | 5.23+ | 4.79+ | 4.70+ | 6.93 | 6.35 | 3.99+ | 5.27+ | 12.68+ | 4.69+ | 4.56+ | 3.35+ |
| | 45 | 12.01 | 6.36+ | 4.24 | 3.37+ | 4.28+ | 4.95+ | 3.90+ | 3.85+ | 5.75+ | 3.49+ | 3.93+ | 4.56+ |
| | 50 | 8.66 | 4.62+ | 3.53 | 4.50+ | 7.81 | 4.83+ | 2.59+ | 3.29+ | 7.22 | 4.94+ | 2.72 | 4.46+ |
| | 60 | 1.75+ | 19.52 | 1.62 | 4.16+ | 3.86 | 2.95 | 2.09+ | 2.26 | 5.03 | 3.86+ | 2.47 | 25.24 |

All values have units of cd/lux/m$^3$

What is claimed is:

1. A method of forming retroreflective sheeting comprising the steps of:
   a) forming a mold by:
      (i) forming three parallel sets of grooves in a body of mold material; the grooves intersecting at an angle to form a plurality of prism pairs each prism in a pair having a base and three intersecting lateral faces which meet at an apex, and wherein the apices of prism pairs are equal in height;
      (ii) removing a portion of at least one face of a prism to form prism pairs with apices of unequal height;
   b) forming said sheeting in said mold; and
   c) removing the sheeting from the mold.

2. The method of claim 1 wherein the optical axis of pairs of prisms are tilted in a negative direction.

3. The method of claim 1 wherein the step of removing also forms a window extending from said face having the removed portion.

4. The method of claim 1 wherein the window is formed above the base of the prisms.

5. Retroreflective sheeting formed by the method of claim 1.

6. The method of claim 1 including the step of metallizing the sheeting on a prism face side.

7. A method of forming retroreflective sheeting comprising the steps of:
   a) forming a mold comprised of a plurality of prism pairs, each prism having a base and three intersecting lateral faces which meet at an apex and wherein a plurality of said prism pairs are of equal size and modifying the prism pairs of equal size by removing a portion of one of the prisms in the prism pairs, said portion extending from an apex through a face leaving said one prism smaller in size than an adjacent larger size prism;
   b) forming said sheeting in said mold; and
   c) removing said sheeting from said mold.

8. The method of claim 7 wherein a window is formed in said mold which extends from a face of said smaller prism.

9. The method of claim 7 wherein the prisms of equal size are made by forming three parallel sets of grooves in a body of mold material; the grooves intersecting at an angle to form a plurality of prisms each prism having a base and three intersecting lateral faces which meet at an apex.

10. A method of forming retroreflective sheeting comprising the steps of:
    a) forming a mold by:
       (i) forming three parallel sets of groves in a body of mold material; the groves intersecting at an angle to form a plurality of prism pairs each prism in a pair having a base and three intersecting lateral faces which meet at an apex, and wherein the apices of prism pairs are equal in height;
       (ii) removing a portion of at least one face of a prism to form prism pairs with apices of unequal height and wherein a planar window is left between the prism pairs of unequal height;
    b) forming said sheeting in said mold; and
    c) removing the sheeting from the mold.

11. The method of claim 10 wherein the window lies in a plane above the plane of the prism base.

* * * * *

UNITED STATES PATENT AND TRADEMARK OFFICE
CERTIFICATE OF CORRECTION

PATENT NO. : 5,565,151
DATED : October 15, 1996
INVENTOR(S) : Robert B. Nilsen

It is certified that error appears in the above-indentified patent and that said Letters Patent is hereby corrected as shown below:

Claim 4, column 19, line 21, delete "claim 1" and replace it with ---claim 3---.

Signed and Sealed this

Eighteenth Day of February, 1997

Attest:

BRUCE LEHMAN

Attesting Officer      *Commissioner of Patents and Trademarks*

UNITED STATES PATENT AND TRADEMARK OFFICE
CERTIFICATE OF CORRECTION

PATENT NO. : 5,565,151
DATED : October 15, 1996
INVENTOR(S) : Robert B. Nilsen

It is certified that error appears in the above-identified patent and that said Letters Patent is hereby corrected as shown below:

Claim 10, column 20, lines 17 and 18, delete "groves" and substitute therefor --grooves--.

Signed and Sealed this

Twenty-fifth Day of August, 1998

Attest:

BRUCE LEHMAN

Attesting Officer

Commissioner of Patents and Trademarks